United States Patent
Fujita et al.

[11] Patent Number: 6,143,097
[45] Date of Patent: Nov. 7, 2000

[54] MAGNESIUM ALLOY CAST MATERIAL FOR PLASTIC PROCESSING, MAGNESIUM ALLOY MEMBER USING THE SAME, AND MANUFACTURING METHOD THEREOF

[75] Inventors: Makoto Fujita, Higashihiroshima; Nobuo Sakate, Hiroshima; Shoji Hirabara, Hiroshima; Yukio Yamamoto, Hiroshima, all of Japan

[73] Assignee: Mazda Motor Corporation, Hiroshima-Ken, Japan

[21] Appl. No.: 08/947,414

[22] Filed: Oct. 8, 1997

Related U.S. Application Data

[63] Continuation of application No. 08/359,303, Dec. 19, 1994, abandoned.

[30] Foreign Application Priority Data

| Dec. 17, 1993 | [JP] | Japan | ..... 5-318076 |
| Apr. 20, 1994 | [JP] | Japan | ..... 6-004165 U |
| Apr. 20, 1994 | [JP] | Japan | ..... 6-081925 |

[51] Int. Cl.[7] .................................................. C22L 23/00
[52] U.S. Cl. ............... 148/420; 420/409; 428/469; 428/472.3; 301/95; 301/105.1
[58] Field of Search ............... 148/420; 420/407, 420/408, 409, 410, 411, 412, 413; 428/469, 472.3; 301/95, 105.1

[56] References Cited

U.S. PATENT DOCUMENTS

| 2,095,975 | 10/1937 | Fischer | ..... 420/409 |
| 3,094,413 | 6/1963 | Fisher et al. | ..... 148/420 |
| 3,718,460 | 2/1973 | Foerster | ..... 420/410 |
| 5,073,207 | 12/1991 | Faure et al. | ..... 420/407 |
| 5,143,564 | 9/1992 | Gruzleski et al. | ..... 148/420 |
| 5,651,590 | 7/1997 | Word | ..... 301/64.2 |
| 5,902,424 | 5/1999 | Fujita et al. | ..... 148/667 |

FOREIGN PATENT DOCUMENTS

| 496466 | 9/1953 | Canada | ..... 420/412 |
| 0478479 | 4/1992 | European Pat. Off. . | |
| 3242233 | 5/1984 | Germany . | |
| 60-33360 | 2/1985 | Japan . | |
| 2-25419 | 5/1987 | Japan . | |
| 63-282232 | 11/1988 | Japan . | |
| 5-58101 | 8/1991 | Japan . | |
| 1239822 | 7/1971 | United Kingdom | ..... 420/409 |

*Primary Examiner*—John Sheehan
*Attorney, Agent, or Firm*—Morrison & Foerster LLP

[57] ABSTRACT

This invention is to provide a magnesium alloy cast material capable of manufacturing a wheel, a large-sized forged piece such as wheel having properties equivalent to those of aluminum molten forged member, directly from the state of continuous cast material. The magnesium alloy cast material is a nearly intermediate alloy composition between conventional AZ61 alloy and AZ80 alloy, comprising Al: 6.2 to 7.6 wt. %, Mn: 0.15 to 0.4 wt. %, Zn: 0.4 to 0.8 wt. % and Mg: balance, and casting by defining the mean crystal grain size under 200 μm. The forgeability is excellent, and when forged, a forged piece superior in mechanical properties and corrosion resistance to the aluminum molten forged member can be manufactured.

37 Claims, 25 Drawing Sheets

Crystal grain size distribution of test piece

- ■ 20 μm
- ▨ 30 μm
- ▩ 40 μm
- ▦ 50 μm
- ☐ 80 μm

Crystal grain size distribution of test piece

Fig. 24
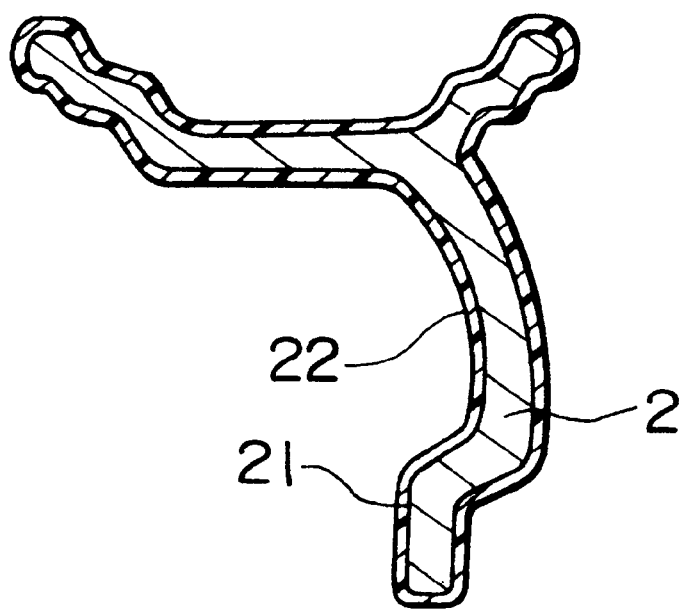
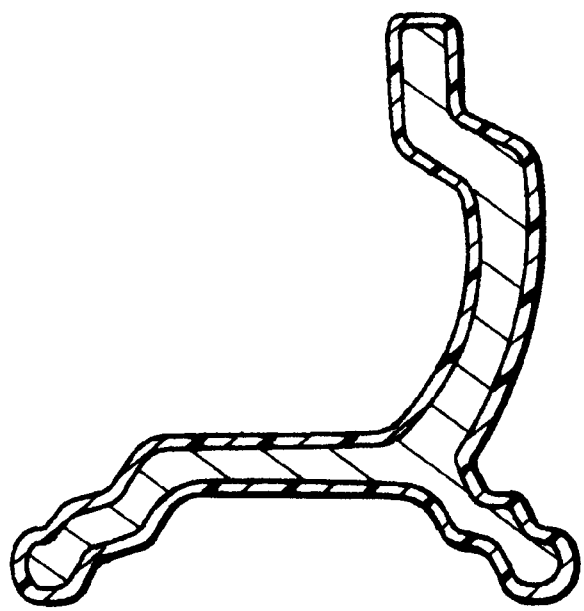

Fig. 25
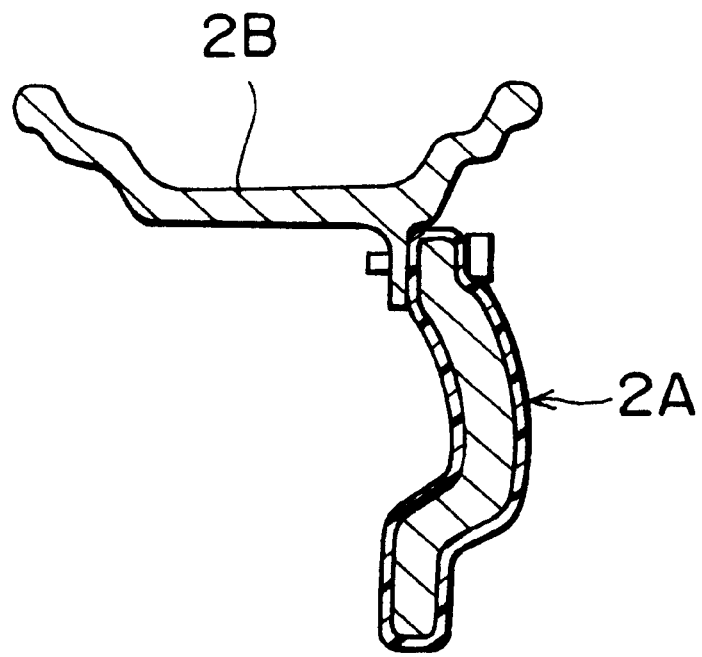
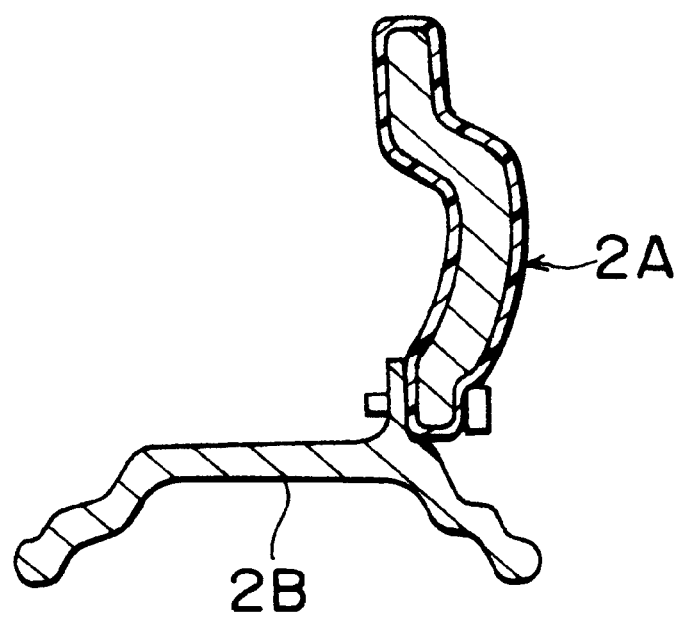

MAGNESIUM ALLOY CAST MATERIAL FOR PLASTIC PROCESSING, MAGNESIUM ALLOY MEMBER USING THE SAME, AND MANUFACTURING METHOD THEREOF

This application is a continuation of application Ser. No. 08/359,303, filed Dec. 19, 1994, now abandoned.

BACKGROUND OF THE INVENTION

1. Field of the Invention

The present invention relates to a magnesium alloy cast material for plastic processing, a magnesium alloy member using the same, and a manufacturing method thereof.

2. Description of Related Art

A magnesium alloy has a specific gravity of about 1.8, which is ⅔ times as heavy as an aluminum alloy, and is highly expected as a substitute for reducing the weight of members. At the present, however, parts are mainly manufactured by die casting, and applicable parts are mostly parts of low strength such as cases and covers. If, therefore, materials applicable to high strength parts and method of manufacturing at low cost are established, the industrial value will be significant.

Existing magnesium alloys are generally poor in forgeability, and ZK60 alloy relatively excellent in formability is used in forging. This alloy is, however, expensive because much zirconium is contained as alloy element, and is poor in corrosion resistance.

On the other hand, as a corrosion resistant favorable forging material, materials undergoing plastic processing such as extrusion after casting of AZ80 alloy are presented, but they are also expensive and are not always suited as alloys for strength member such as wheels. Yet, members such as wheels require extrusion materials for large-sized forged parts, but it is difficult in reality.

To be used as wheels or the like, therefore, large-sized forging part materials must be presented by continuous casting method, but since impact value is important as well as tensile strength and elongation, a greater wall thickness is needed in order to achieve the same strength as that of aluminum forging material, which is contrary to the weight reducing effect. Application of magnesium alloy to large strength member must utilize a continuous casting material having a micro crystal grain. Methods are hence proposed to refine the mean crystal grain size of magnesium alloy cast material (casting billet). One of the methods is disclosed in the Japanese Patent Tokkaisho No. 63-282232, in which molten magnesium alloy is continuously cast at a solidification rate of 25° C./sec or more, or magnesium alloy ingot is plastically processed at 220 to 450° C. at a processing rate of 25% or more. Other proposed methods include a casting method of refining the mean crystal grain size by adding an refining agent.

SUMMARY OF THE INVENTION

However, continuously casting at a solidification rate of 25° C./sec or more make a temperature gradient between outer surface and central part in the casting billet to be greater. Therefore, in order to obtain a good quality cast billet, the casted billet diameter must be limited to 5 to 100 mm, which is too small to make a large forged member such as an automobile wheel. In the continuous casting process carried out at an ordinal cooling rate, it is required to develop a refining method to obtain the required mechanical properties of wheels and others.

It is hence a primary object of the present invention to provide a magnesium alloy cast material capable of manufacturing a large-sized forged part such as the automobile wheel in desired properties directly from material state after continuous casting, without using ZK60 alloy cast material or ZA80 alloy extrusion material.

It is a second object of the present invention to provide a large-sized forged part such as a wheel having properties equivalent to those of aluminum molten forged member, manufactured by using such continuous cast material, and its manufacturing method.

The invention has been achieved by discovering that Al content of the magnesium alloy is significant to control the mean crystal grain size at the ordinary cooling rate in the continuous casting process. According to the fact, by selecting and casting a nearly intermediate alloy composition between the conventional AZ61 alloy and AZ80 alloy, there can be provided cast materials to be forged excellent in forgeability, and excellent in mechanical properties and corrosion resistance as strength member when forged directly.

According to a first aspect of the present invention, there is provided a magnesium alloy cast material for plastic processing excellent in forgeability wherein principal alloy elements are composed of Al, Mn and Zn and the mean crystal grain size of material texture is 200 μm or less, preferably Al of the principal alloy elements is 6.2 to 7.6 wt. %, more preferably the principal alloy elements are the following alloy element components.

Al: 6.2 to 7.6 wt. %
Mn: 0.15 to 0.5 wt. %
Zn: 0.4 to 0.8 wt. %
Mg: balance

According to a second aspect of the present invention, there is provided a magnesium cast material for plastic processing excellent in forgeability wherein principal alloy elements are composed of Al, Mn, Zn and Sr and the mean crystal grain size of material texture is 200 μm or less, preferably Al of the principal alloy elements is 6.2 to 7.6 wt. %, more preferably the principal alloy elements are the following alloy element components.

Al: 6.2 to 7.6 wt. %
Mn: 0.15 to 0.5 wt. %
Zn: 0.4 to 0.8 wt. %
Sr 0.02 to 0.5 wt. %
Mg: balance According to the invention, when the magnesium alloy material, of which principal alloy elements are composed of Al, Mn and Zn, preferably Al of the principal alloy elements being 6.2 to 7.6 wt. %, is casted at the ordinary cooling rate of about 7° C./sec by the ordinary continuous casting process, the cast material will have the mean crystal grain size of 200 μm or less and thus is provided with a limit upsetting rate of 60% or more. Therefore, the present Mg alloy cast material can be directly forged without any treatment(see FIG. 1). In particular, the cast material with the mean crystal grain size of 80 μm or less is excellent in high speed forgeability (see FIG. 9 and FIG. 10).

According to a third aspect of the present invention, there is provided a method for producing a magnesium alloy cast material, which comprises steps of:

providing a magnesium alloy cast material melt of which principal alloy elements are composed of Al, Mn and Zn, preferably Al of 6.2 to 7.6 wt. %, and casting the melt to give a magnesium alloy cast material having a mean crystal grain size of 200 μm or less.

In a preferred method for producing the above Mg alloy cast material, addition of Sr and/or CaNCN as the refining agent can make the mean crystal grain size to be 200 μm or less even at the cooling rate of about 3° C./sec or to be 80 μm or less at the cooling rate of about 7° C./sec. Accordingly, there can be provided a method for producing a magnesium alloy cast material which comprises steps of:

providing a magnesium alloy cast material melt of which principal alloy elements are composed of Al, Mn and Zn wherein Al is 6.2 to 7.6 wt. %, adding a refining agent into the melt, and casting the melt at cooling rate of 3 to 15° C./sec to give a magnesium alloy cast material having a mean crystal grain size of 200 μm or less.

In the preferred method, the magnesium alloy melt may be casted with addition of the refining agent such as Sr or CaNCN. Sr may be added as Sr alloy with the other alloy elements. CaNCN of 0.3 to 0.7 wt. % may be added. The casting may be carried out by means of a continuous casting method, so that a large diameter cast material ca be provided. The casting may be conducted from half molten state of the melt to be casted.

The magnesium alloy cast material may be subjected to a forging step, so that it can be made to give a metal texture having the mean crystal grain size of 100 μm or less.

Therefore, according to a fourth aspect of the present invention, there is provided a method for manufacturing a magnesium alloy member which comprises steps of:

providing a magnesium alloy cast material of which principal alloy elements are composed of Al, Mn and Zn wherein Al is 6.2 to 7.6 wt. % and the mean crystal grain size is 200 μm or less, and subjecting the magnesium alloy cast material to a plastic processing to give a final product provided with a metal texture having the mean crystal grain size of 100 μm or less.

The plastic processing may be a forging. The forging may comprises at least two forging steps. In such case, the second and subsequent steps may be conducted at higher speed than in the first step. The forged material may be further subjected to solution annealing and age hardening, particularly heating with T6.

The method is suitable for producing a magnesium alloy cast wheel.

BRIEF DESCRIPTION OF THE DRAWINGS

The above and other objectives and features of the present invention will become more apparent from the following description of a preferred embodiment thereof with reference to the accompanying drawings, throughout which like parts are designated by like reference numerals, and wherein:

FIG. 24 is a sectional view along the cutting center line of the first wheel embodiment.

FIG. 25 is a sectional view along the cutting center line of the second wheel embodiment.

DETAILED DESCRIPTION OF THE PREFERRED EMBODIMENTS

The composition definition of alloy elements is described below.

Figure 3:
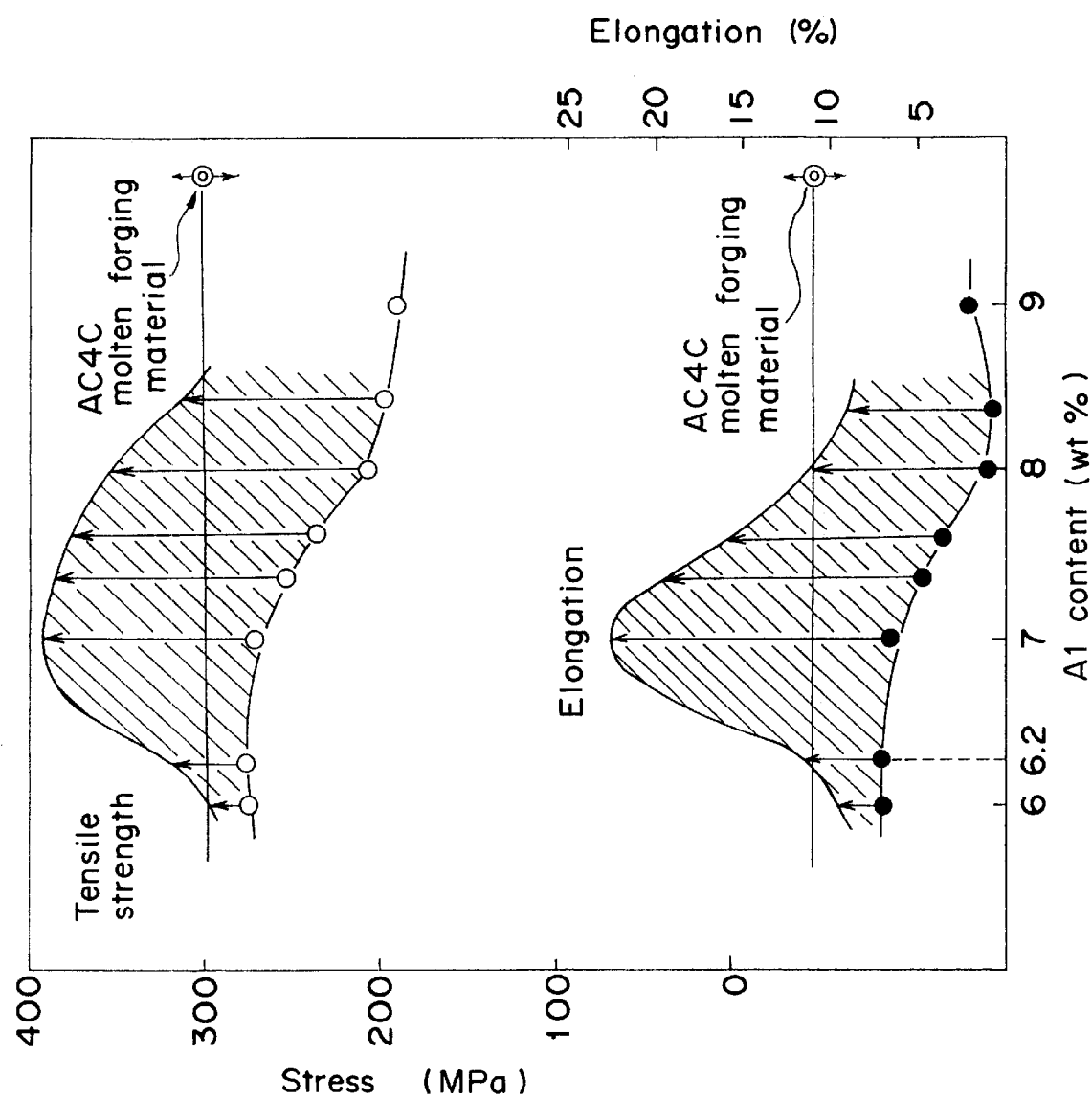
FIG. 3 is a graph showing the relation of Al content, tensile strength and elongation in forged piece of the alloy of the invention.

Supposing to apply magnesium alloys in strength components, Al-Zn-Mn alloy is excellent from the viewpoint of corrosion resistance. In this alloy, however, there is a close relationship among the crystal grain size, the strength characteristics (tensile strength, elongation, corrosion resistance, and impact properties), and Al content, and appropriate values must be selected. For example, when the Al content is lowered, the elongation and impact value are improved, while the corrosion resistance tends to decline. On the other hand, when the crystal grain size is smaller, the corrosion resistance is enhanced by heat treatment (T6 treatment). These were new findings. It was hence attempted to improve the strength and corrosion resistance by properly selecting the grain size. The invention is required to have strength characteristics equivalent to those of Al alloy (for example, AC4C molten forging material of JIS, 6061 forging material of JIS), and therefore in the range of aluminum content of 6 to 9 wt. %, the tensile strength and elongation were compared with those of AC4C molten forging material. The result is shown in FIG. 3. As known from FIG. 3, an excellent tensile strength, or the strength better than the tensile strength of AC4C molten forging material was obtained in a range of Al content of 6 to 8.5 wt. %. In the aspect of elongation, however, in order to achieve the level exceeding the AC4C molten forging material, the required Al content was 6.2 wt. % or more and 8 wt. % or less. In this comparison of characteristics, the improving properties of tensile strength and elongation at an upsetting rate of 60% required in ordinary forging were put into consideration. Therefore, from the viewpoint of relation of tensile strength and elongation, the Al content is preferred to be 6.2 wt. % or more to 8 wt. % or less.

Figure 4:
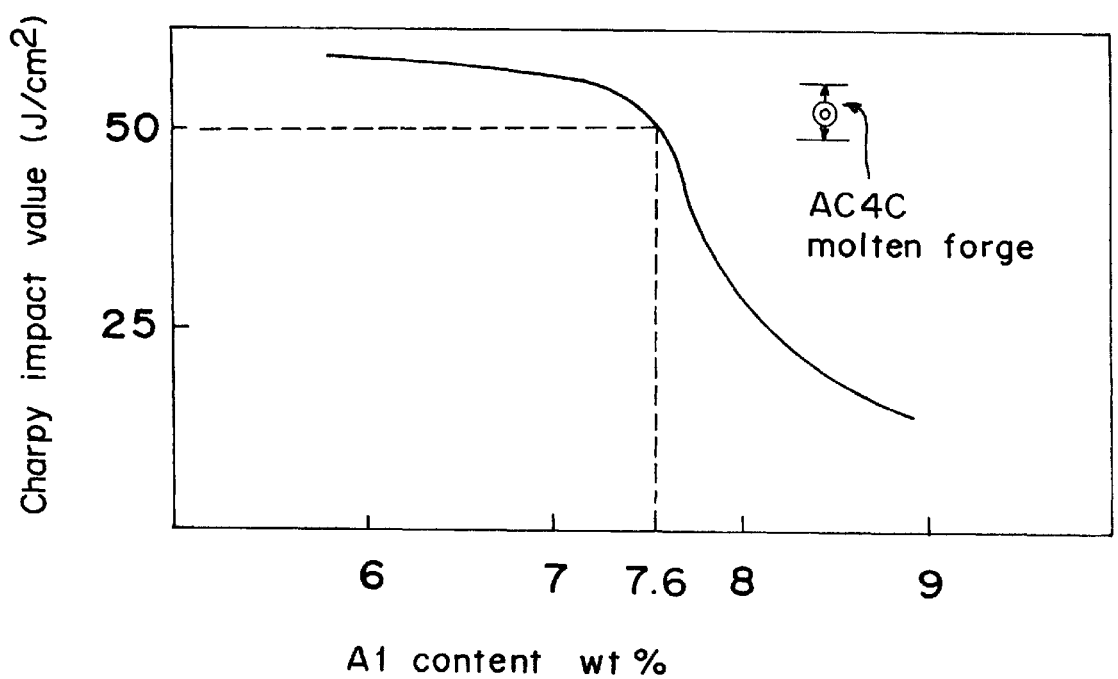
FIG. 4 is a graph showing the relation of Al content and Charpy impact value in forged piece of the alloy of the invention.

Investigating the Charpy impact value, as shown in FIG. 4, when the Al content exceeds 7.6 wt. %, it was found to drop suddenly below the Charpy impact value of AC4C aluminum molten forging material. It was hence known preferable to define the upper limit of the aluminum content range by the Charpy impact value, and the lower limit by the tensile characteristic. Hence, the Al content was defined at 6.2 wt. % or more to 7.6 wt. % or less.

Figure 11:
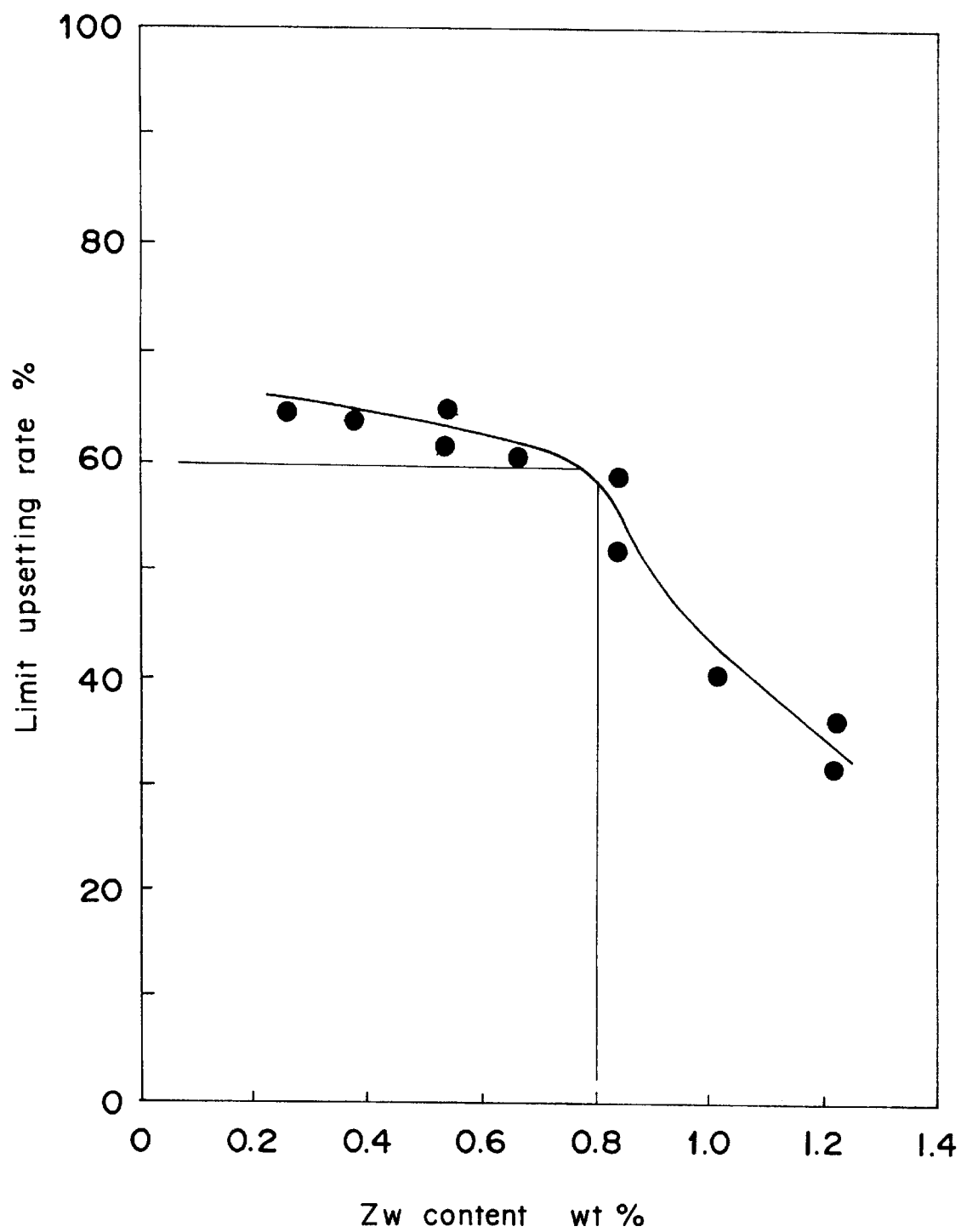
FIG. 11 is a graph showing the relation of Zn content and limit upsetting rate of cast material of the invention.

Concerning the alloy element Zn, it is an element, like Al, that provides a magnesium alloy with a strength characteristic. To obtain large-diameter forging billets, there is no other casting method than continuous casting. In this cases, the crystal grain size can be adjusted by the cooling rate or by using refining agents, but it is hard to control under 100 $\mu$m. Usually, the mean crystal grain size of large-diameter continuous cast material is about 200 $\mu$m. When forming such cast material with a relatively large crystal grain size, the Zn content is an influential factor for forming. Zn crystallizes in the alloy as a compound of MgAlZn, and contributes to enhancement of strength of magnesium alloy as mentioned above, but if excessive in content, it worsens the forming and is not preferable for forming. Accordingly, to obtain a necessary strength, the lower limit was defined at 0.4 wt. % or more, and the upper limit was 0.8 wt. % or less in consideration of the forging property. That is, in the chemical composition table in Table 3, by varying the Zn content in a range of 0.25 to 1.20 wt. %, when the limit upsetting rate along with change of Zn content was considered, as shown in FIG. 11, the limit upsetting rate dropped below 60% when the Zn content exceeded 0.8 wt. %.

The alloy element Mn was defined as follows. Mn mainly acts to suppress Fe content, and is effective for corrosion resistant structure of material, but it is not effective if less than 0.15 wt. %, or has an adverse effect on forging if exceeding 0.5 wt. %.

Figure 23:
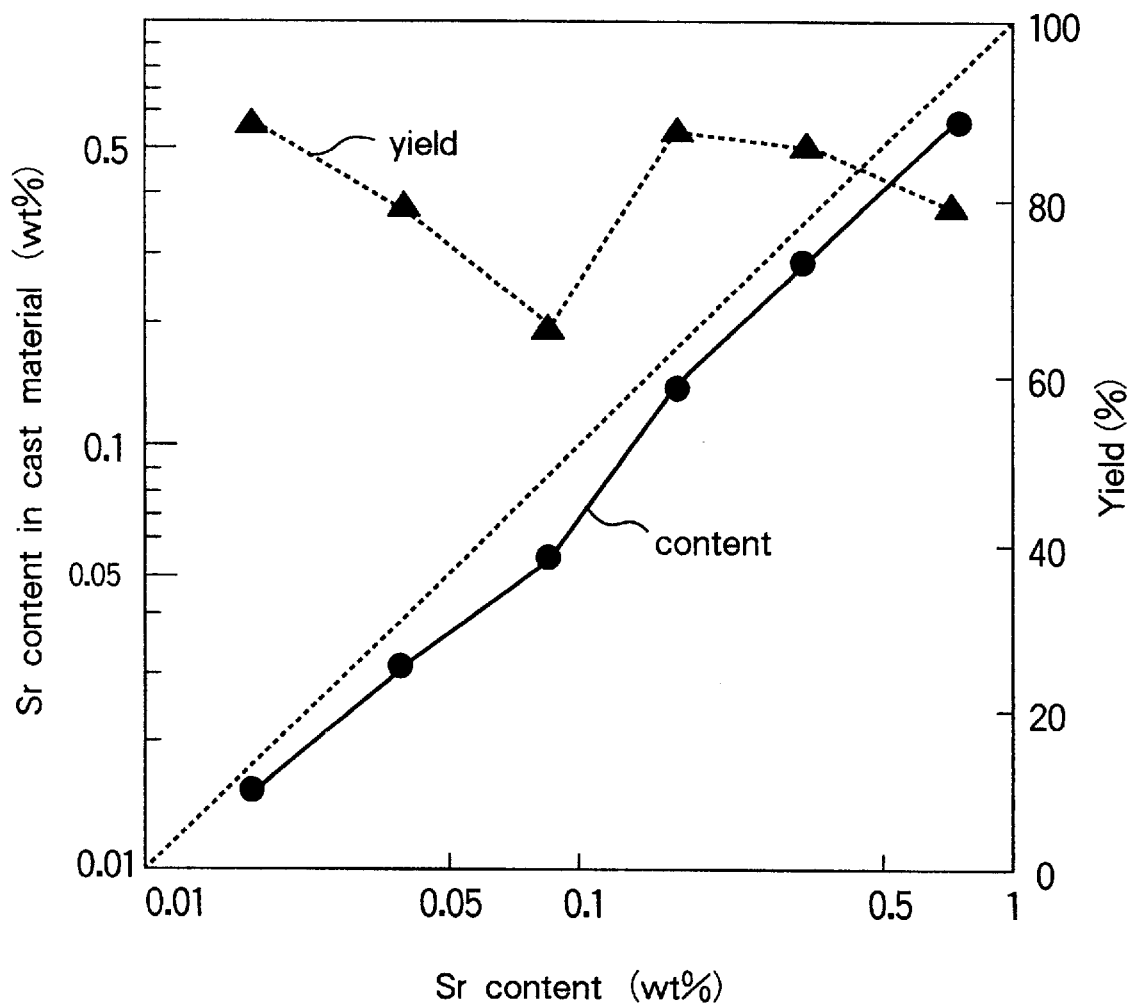
FIG. 23 is a graph showing relation between the Sr addition amount and the Sr remaining amount in the Mg alloy cast material.

Concerning the other alloy element, Sr and CaNCN may remain when they are used as the refining agent. In case of Sr, as shown in FIG. 23, about 80% of the addition amount can remain, so that 0.02 wt. % or more of the remaining Sr can make Mg alloy cast texture to be finer while 0.5 wt. % or more of the remaining Sr may give a bad influence to forgeability and mechanical characteristics after forging.

After plastic processing of the cast material composed of these alloy components, if the mean crystal grain size of the material texture is 100 $\mu$m or less, a magnesium alloy member having tensile characteristics with elongation of 10% or more and tensile strength of 300 MPa or more can be presented. In particular, when the mean crystal grain size of material texture is 50 $\mu$m or less, the Charpy impact value (50 J/cm$^2$) of AC4C molten forging material or higher may be obtained.

In manufacturing the forged member, the magnesium alloy material composed of these alloy element components is cast to the mean crystal grain size of 200 $\mu$m or less, and the cast material is processed plastically to compose a texture with the mean crystal grain size of 100 $\mu$m or less, and the final product is preferably subjected to solution annealing and age hardening such as heat treating with T6. In case of the treated final product having a metal texture with the mean crystal grain size of 50 $\mu$m or less, it comes to have a higher corrosion resistance than that of AZ91D. If the plastic processing is carried out at a temperature of 350° C. or more, only simple age hardening can make the final product to have the same characteristics as above.

Preferably, casting should be done from half molten state. This is because the mechanical properties after forging process can be enhanced.

In forging as plastic processing, the strain speed exceeding the limit upsetting rate of 60% must be a relatively low speed near the mean crystal grain size of 200 $\mu$m, it is preferred to forge at low speed in the first step, and at higher speed in the second and subsequent steps.

Embodiments:

Embodiment 1 (Relation between crystal grain size and forgeability)

Figure 1:
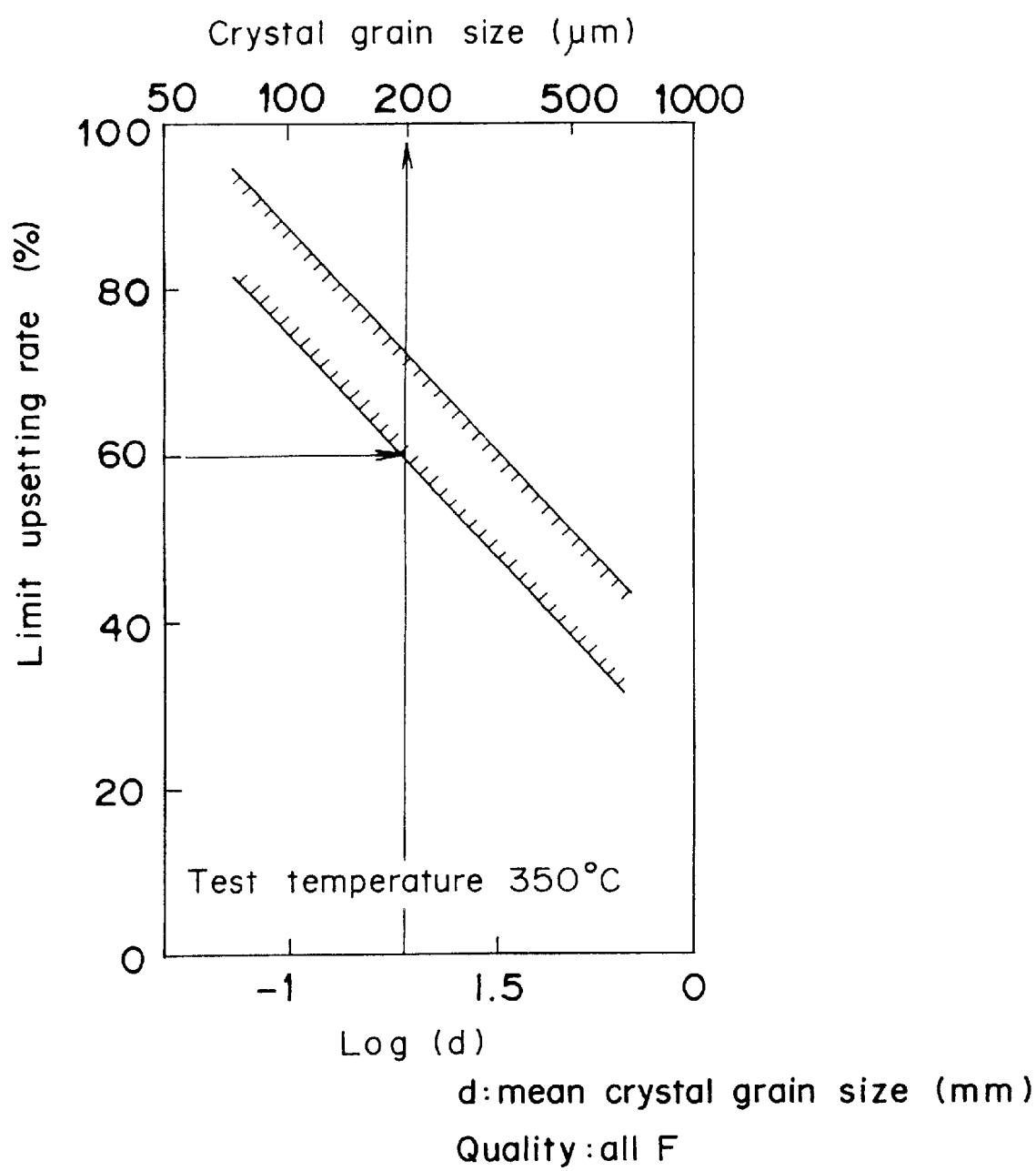
FIG. 1 is a graph showing the relation between the crystal grain size and limit upsetting rate of Mg alloy cast material.
Figure 2:
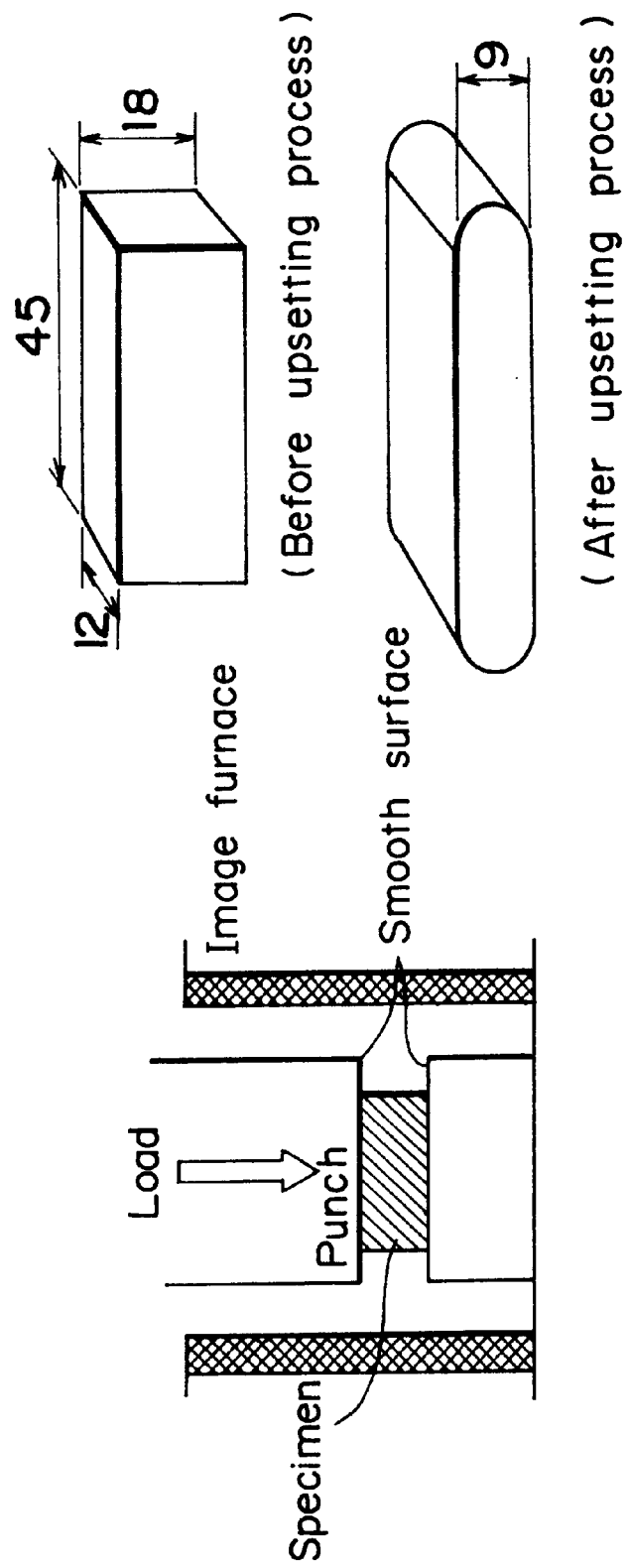
FIG. 2 is an explanatory diagram of upsetting test of cast material.

Using the Mg alloy in the chemical composition (wt. %) as shown in Table 1, a forging material (H 42 mm, $\phi$28 mm) was cast, and was processed by upsetting at material temperature of 350° C. in a test apparatus as shown in FIG. 2 (strain speed: low speed, about 10%/sec), and the relation between the crystal grain size and limit upsetting rate (=initial height H−cracked height H'/H×100) was determined. The result is shown in FIG. 1.

Accordingly, to obtain the forgeability exceeding the limit upsetting rate of 60% necessary for forging, the required crystal grain size was found to be 200 $\mu$m or less.

TABLE 1

| Al | Mn | Zn | Ni | Cu | Fe | Si | (Wt. %) Mg |
|---|---|---|---|---|---|---|---|
| 6.0 −9.0 | 0.20 −0.25 | 0.55 −0.60 | 0.001 | 0.005 | 0.002 | 0.040 | balance |

Embodiment 2 (Relation between strain speed and forming property)

Figure 8:
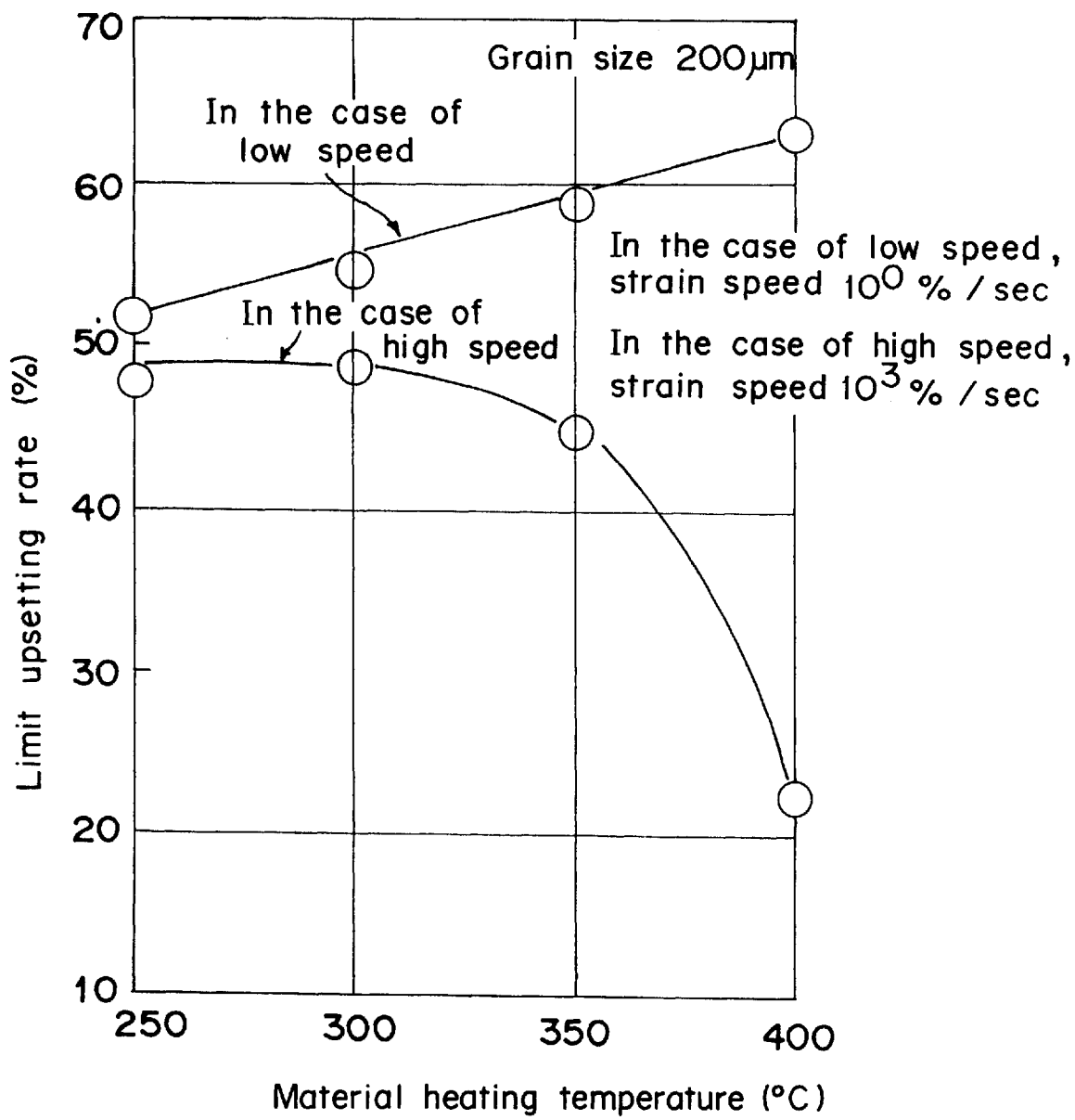
FIG. 8 is a graph showing the relation of material heating temperature and limit upsetting rate by low speed and high speed strain processing at mean crystal grain size of 200 μm of cast material of the invention.

Using the Mg alloy in the chemical composition (wt. %) as shown in Table 2, a forging material (H 42 mm, $\phi$28 mm) was cast to the mean crystal grain size of 200 $\mu$m, and was processed by upsetting by 60% at material temperature of 250 to 400° C. in a test apparatus as shown in FIG. 2, at low strain speed of $10^0$%/sec and high speed of $10^3$%/sec, and changes in limit upsetting rate were determined. The result is shown in FIG. 8. It is known from this result that the forgeability of Mg alloy is influenced by the strain speed (related with processing speed), and if the mean crystal grain size is 200 μm or less, in the case of high speed, the forming property is poor, and the manufacturing conditions such as forging temperature are limited.

Figure 9:
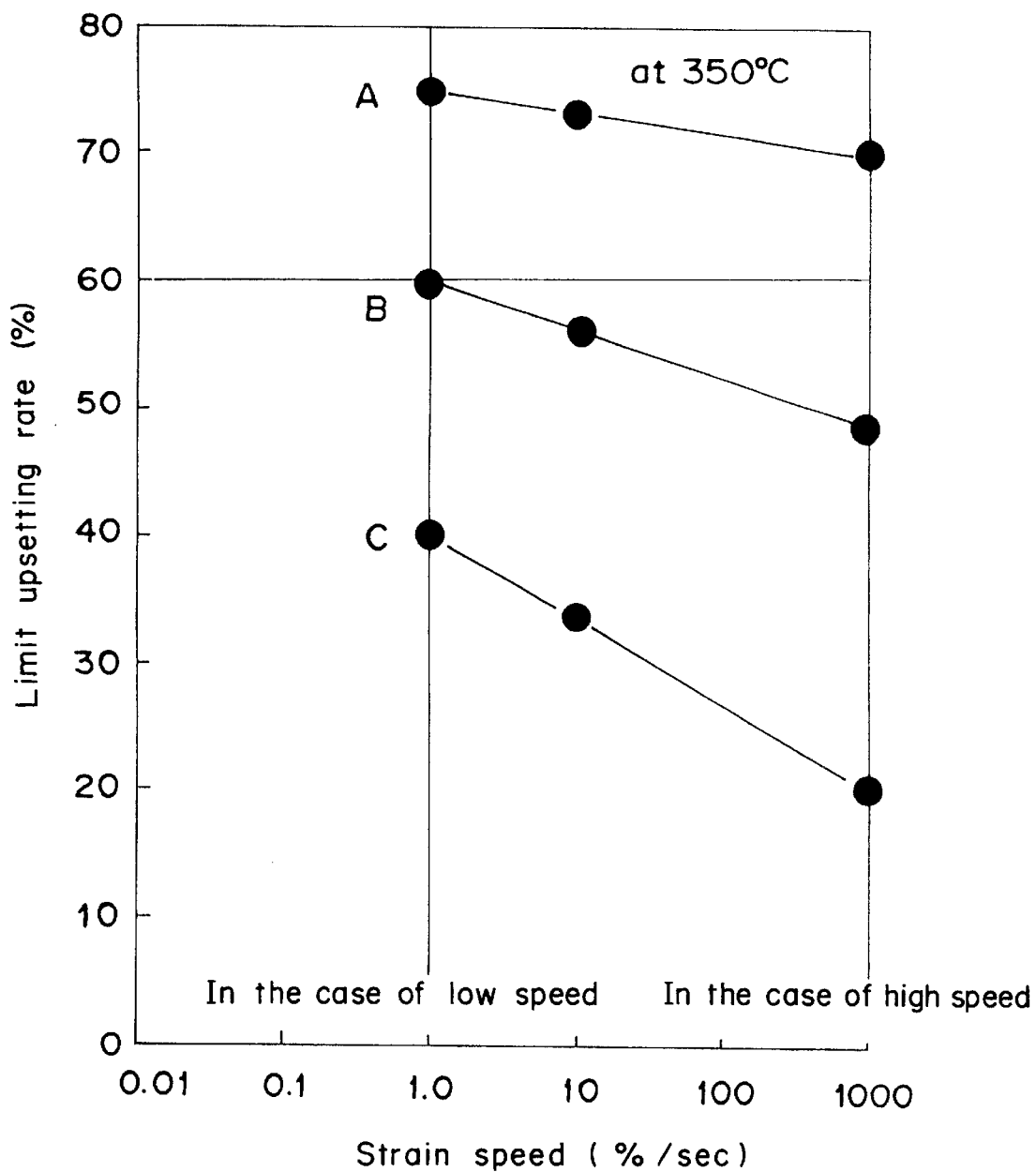
FIG. 9 is a graph showing the relation of strain speed and limit upsetting rate at mean crystal grain size of 125, 200, and 250 μm of cast material of the invention.

Accordingly, in specimens A, B, C, with mean crystal grain size of 125 μm, 200 μm, and 250 μm at forging temperature 350° C., the relation between strain speed and forming property (limit upsetting rate) is shown in FIG. 9. As known from this result, around the mean crystal grain size of 200 μm, it is necessary to set the strain speed low, and if exceeding 200 μm, desired forming property is not obtained even at low speed, but, to the contrary, around 125 μm, desired forming property (limit upsetting rate 60% or more) may be sufficiently obtained even at high speed. Therefore, to manufacture large-sized forged parts by using continuous casts material, the crystal grain size of 200 μm is needed.

TABLE 2

| Al | Mn | Zn | Ni | Cu | Fe | Si | (Wt. %) Mg |
|---|---|---|---|---|---|---|---|
| 7.6 | 0.3 | 0.6 | 0.001 | 0.005 | 0.002 | 0.04 | balance |

Embodiment 3 (Relation between crystal grain size and forming property at high strain speed)

Figure 10:
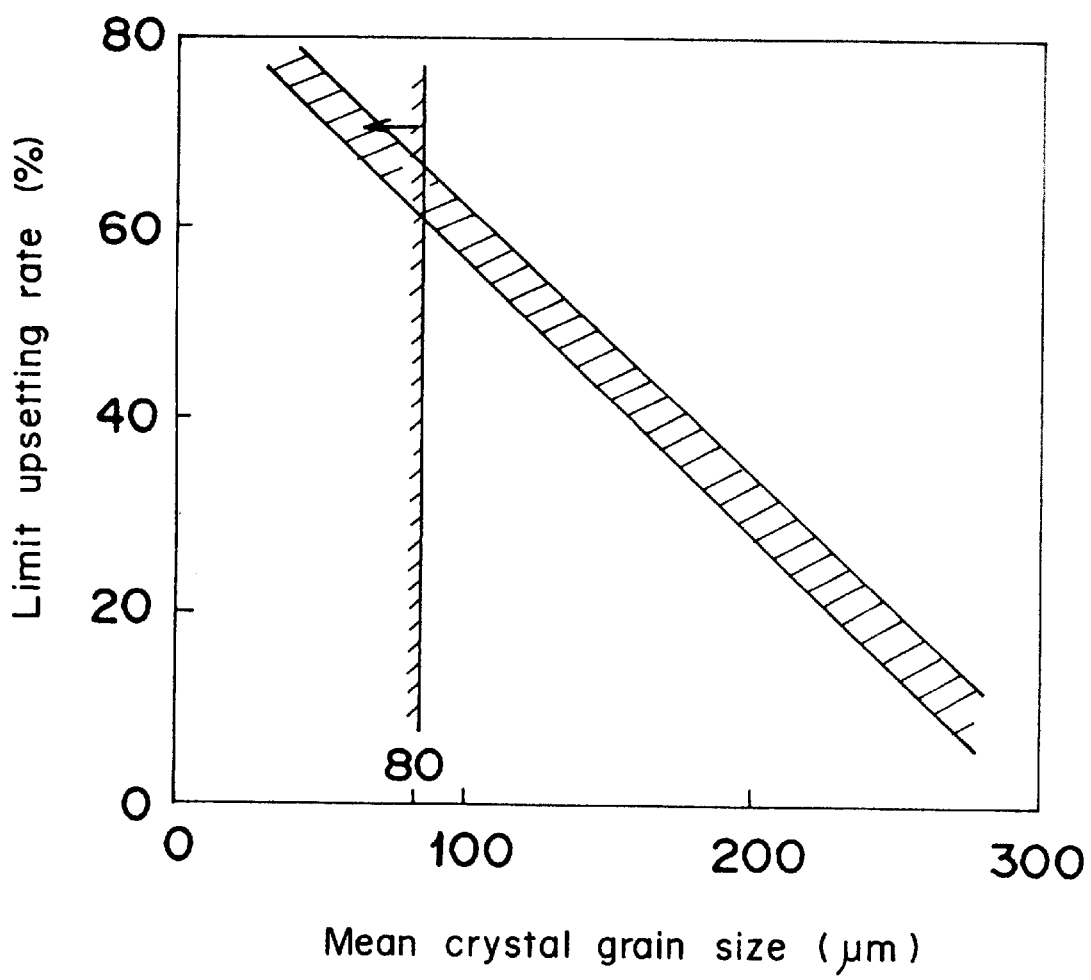
FIG. 10 is a graph showing the relation of crystal grain size and formability at high strain speed.

Using the Mg alloy in the chemical composition (wt. %) as shown in Table 2, a forging material (H 42 mm, φ28 mm) was cast to the mean crystal grain size of 50 to 250 μm, and was processed by upsetting at material temperature of 350° C. in the test apparatus as shown in FIG. 2, at strain speed of $10^3$%/sec, and the relation between the mean crystal grain size and limit upsetting rate was determined. The result is shown in FIG. 10. As known from the result, at high strain speed, the forgeability of Mg alloy exceeds the limit upsetting rate of 60% when the mean crystal grain size is 80 μm or less. This grain size can be achieved by one forging (processing rate of about 50%) by using a cast material with 200 μm.

Embodiment 4 (Relation between Zn content and forming property)

Using the Mg alloy in the chemical composition (wt. %) as shown in Table 3, a forging material (H 42 mm, φ28 mm) was cast to the mean crystal grain size of 200 μm, and was processed by upsetting at material temperature of 350° C. in the test apparatus as shown in FIG. 2, at strain speed of $10^3$%/sec, and the relation between the Zn content and limit upsetting rate was determined. The result is shown in FIG. 11. As known from the result, the Mg alloy could not maintain the limit upsetting rate of 60% if exceeding 0.8 wt. %, and hence it was found necessary to keep under 0.8 wt. %.

TABLE 3

| Al | Mn | Zn | Ni | Cu | Fe | Si | (Wt. %) Mg |
|---|---|---|---|---|---|---|---|
| 7.0 | 0.25 | 0.25–1.20 | 0.001 | 0.005 | 0.002 | 0.042 | balance |

Embodiment 5

Figure 13:
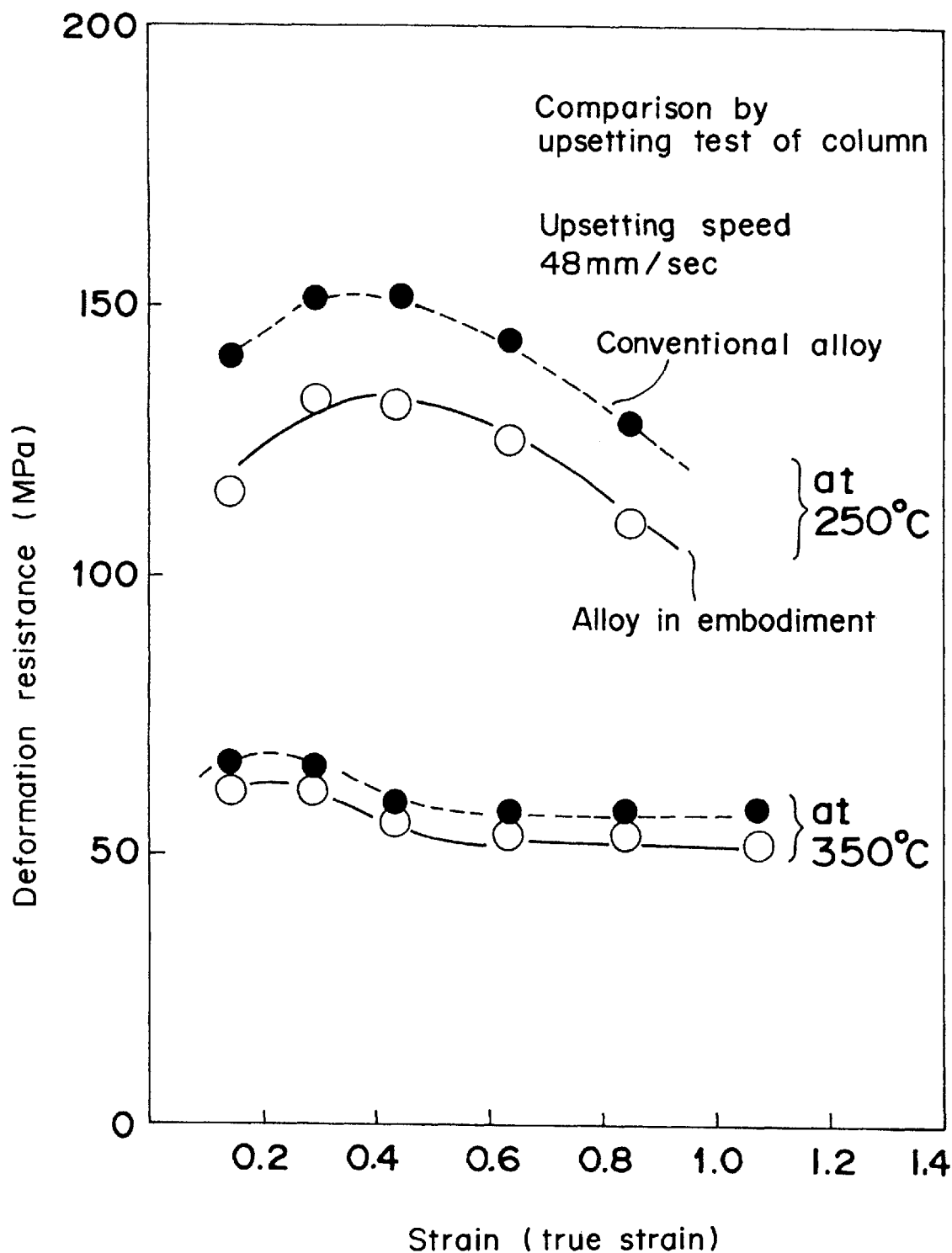
FIG. 13 is a graph showing the relation of strain and deformation resistance in cast material of the invention and conventional AZ80 alloy cast material.

From the Mg alloy in the chemical composition (wt. %) as shown in Table 2 and the conventional AZ80 alloy as shown in Table 4, a forging material (H 42 mm, φ28 mm) was cast to the mean crystal grain size of 200 μm, and was processed by upsetting at material temperature of 250° C. and 350° C. and strain speed of 48 mm/sec in the test apparatus as shown in FIG. 2, and the relation between strain and deformation resistance was determined. The result is shown in FIG. 13. It was known from the result that the Mg alloy of the invention is lower in the forging load and superior in the forgeability as compared with the conventional AZ80 alloy.

TABLE 4

| Al | Mn | Zn | Ni | Cu | Fe | Si | (Wt. %) Mg |
|---|---|---|---|---|---|---|---|
| 8.0 | 0.15 | 0.53 | 0.001 | 0.005 | 0.004 | 0.043 | balance |

Embodiment 6 (Relation between Al content and mechanical properties)

The forging material of Mg alloy A in Table 1 was processed by upsetting at material temperature of 300° C. (strain speed: low speed, about 10%/sec) in the test apparatus shown in FIG. 2, and after processing at the upsetting rate of 60%, it was treated with T6 (400° C.×15 hours cooling in air, 175° C.×16 hours cooling in air), and the relation between the Al content and changes of tensile strength and elongation before and after upsetting was determined. The result is shown in FIG. 3.

It was hence known that properties superior to those of AC4C molten forging material can be obtained in the Al content range from 6.2 wt. % to 8.0 wt. %.

Meanwhile, at the Al content of 9.0 wt. %, upsetting of up to 60% was impossible.

Embodiment 7 (Relation between Al content and Charpy impact value)

The forging material of Mg alloy in Table 1 was processed by upsetting at material temperature of 300° C. (strain speed: low speed, about 10%/sec) in the test apparatus shown in FIG. 2, and after processing at the upsetting rate of 60%, it was treated with T6 (400° C.×15 hours cooling in air, 175° C.×16 hours cooling in air), and the relation between the Al content of Mg alloy after T6 treatment and Charpy impact value was determined. The result is shown in FIG. 4.

At this time, the mean crystal grain size was about 50 μm, but in order to obtain the Charpy impact value of 50 J/cm$^2$ equivalent to that of AC4C molten forging material, the required Al content was found to be 7.6 wt. % or less.

Hence, at Al content of 7.0 wt. %, it was known that the highest results of tensile strength, elongation and Charpy impact value can be obtained.

Embodiment 8 (Relation between crystal grain size and mechanical properties)

Figure 5:
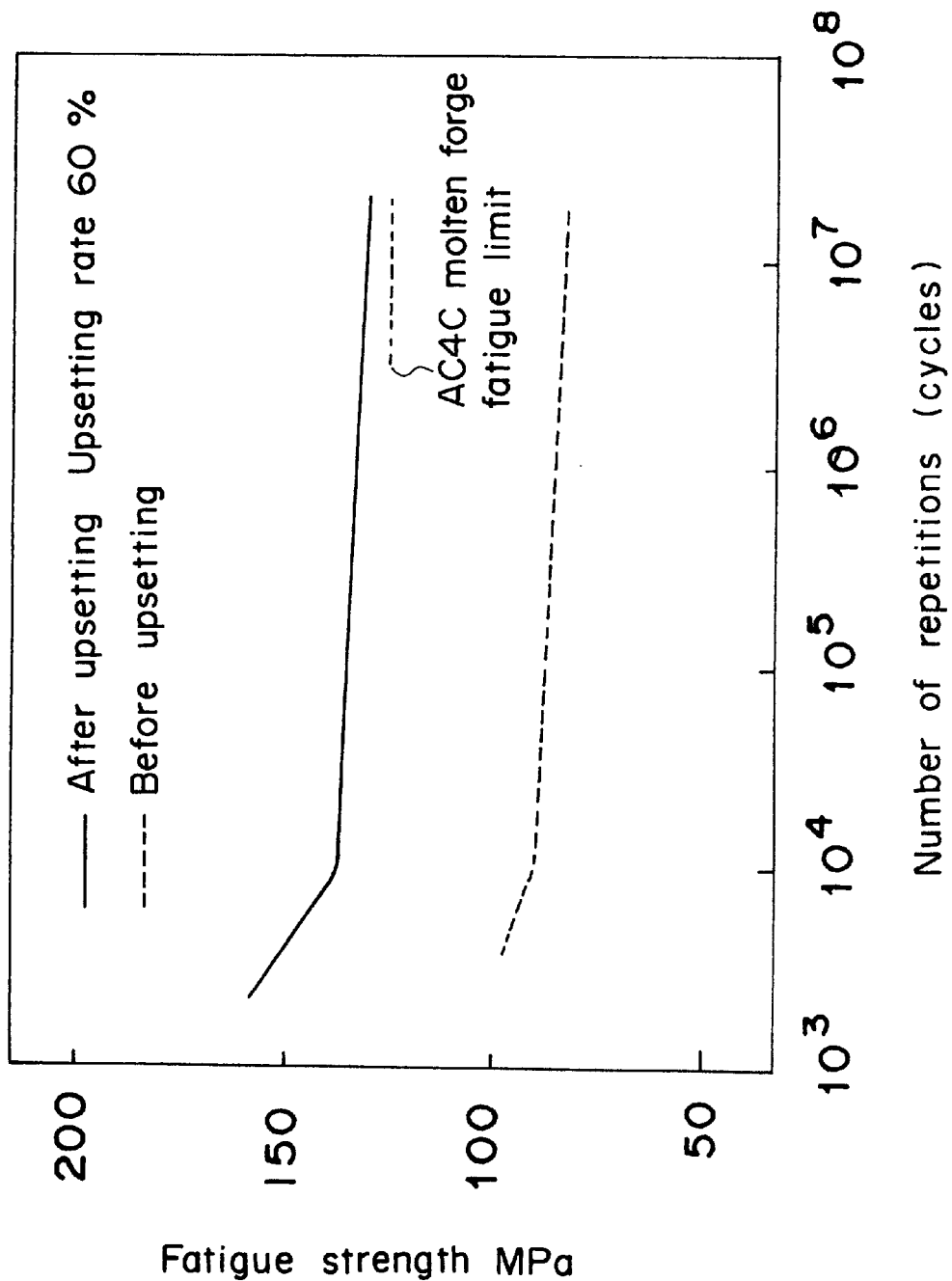
FIG. 5 is a graph showing the rotary bend fatigue characteristic in forged piece of the alloy of the invention.

Using Mg alloy in the chemical composition (wt. %) shown in Table 5, a forging material (H 42 mm, φ28 mm) was cast, and processed by upsetting at 60% (strain speed: low speed, about $10^0$%/sec) at material temperature of 350° C. in the test apparatus in FIG. 2, and treated with T6 same as in embodiment 1, and was presented for rotary bending fatigue test by Ono method, and the rotary bend fatigue characteristic was determined. The result is shown in FIG. 5. It means the performance is superior to that of the AC4C molten forging material.

Figure 6:
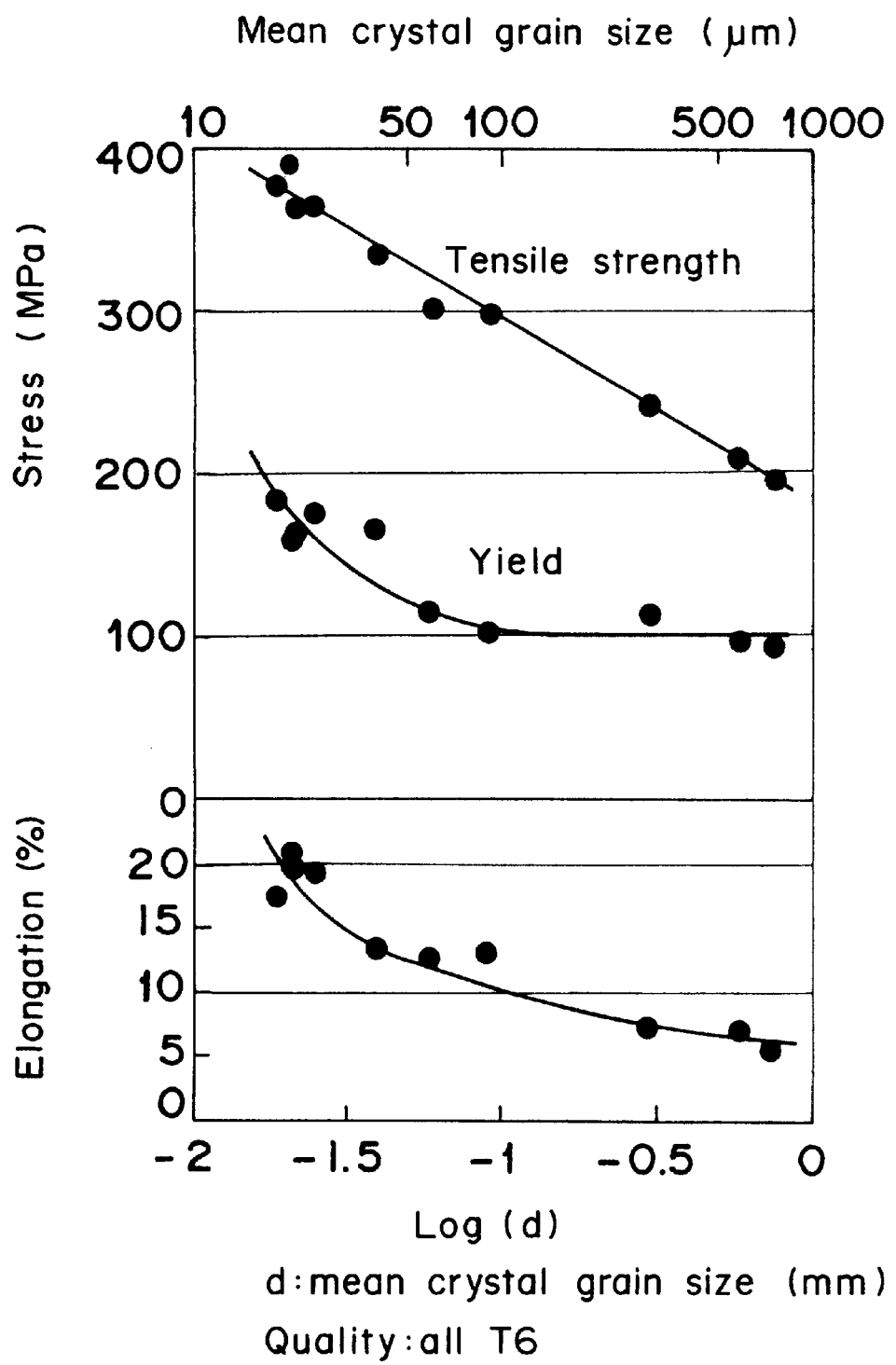
FIG. 6 is a graph showing the relation of mean crystal grain size, tensile strength, yield, and elongation in forged piece of the alloy of the invention.

The relation of the mean crystal grain size, tensile strength (MPa), yield, and elongation (%) after T6 treatment is shown in FIG. 6. In order to obtain the mechanical properties equivalent to those of the AC4C molten forging material, it was known that the mean crystal grain size should be 100 μm or less, particularly considering the deflection point of the yield.

TABLE 5

| Al | Mn | Zn | Ni | Cu | Fe | Si | (Wt. %) Mg |
|---|---|---|---|---|---|---|---|
| 7.0 | 0.25 | 0.57 | 0.001 | 0.005 | 0.002 | 0.042 | balance |

Embodiment 9 (Relation between crystal grain size and Charpy impact value)

Figure 7:
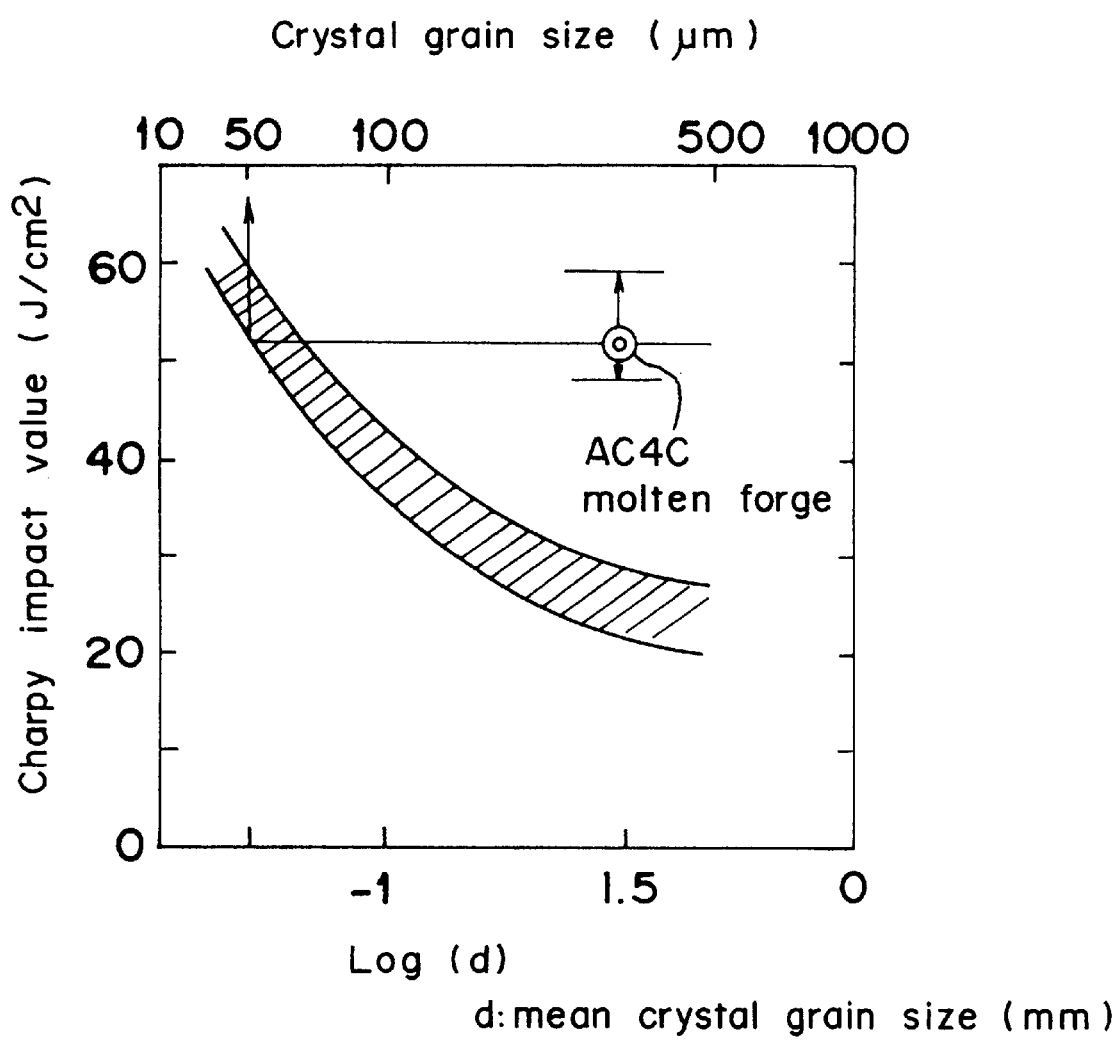
FIG. 7 is a graph showing the relation of mean crystal grain size and Charpy impact value in forged piece of the alloy of the invention.

From Mg alloy in the chemical composition (wt. %) shown in Table 2, a forging material (H 42 mm, φ28 mm) was cast, and processed by upsetting at 60% (strain speed: low speed, about $10^0$%/sec) at material temperature of 350° C. in the test apparatus in FIG. 2, and treated with T6 (400° C.×10 hours cooling in air, 175° C.×16 hours cooling in air), and the relation between the mean crystal grain size (μm) and Charpy impact value (J/cm²) was determined. The result is shown in FIG. 7. It is known therefrom that the crystal grain size is required to be 50 μm or less in order to obtain the impact value equivalent to that of the AC4C molten forging material.

Embodiment 10 (Relation between crystal grain size and corrosion resistance)

Figure 12:
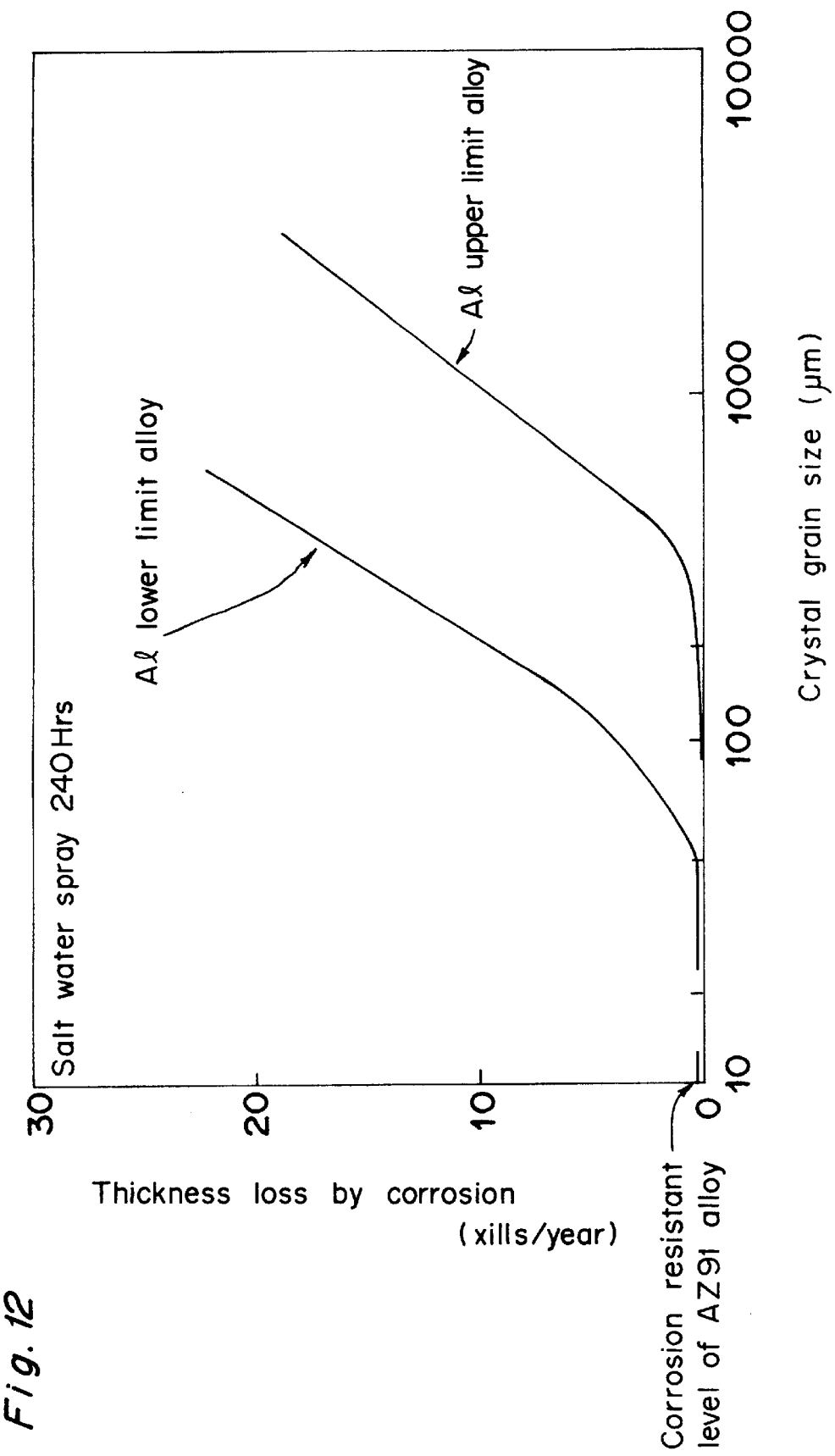
FIG. 12 is a graph showing the relation of crystal grain size and corrosion resistance of Mg alloy forged piece.

From the Mg alloy with the Al content upper limit shown in Table 2 and the Mg alloy with the Al content lower limit shown in Table 6, a forging material (H 42 mm, φ28 mm) was cast, and processed by upsetting at 60% (strain speed: low speed, about $10^0$%/sec) at material temperature of 350° C. in the test apparatus in FIG. 2, and treated with T6 (400° C.×10 hours cooling in air, 175° C.×16 hours cooling in air), and the relation between the mean crystal grain size (μm) and corrosion resistance (mills/year) was determined. The result is shown in FIG. 12. As the crystal grain size becomes smaller, it is known that characteristics equivalent to those of the AZ91D alloy F (unheated) that is known to have the best corrosion resistance among magnesium alloys can be obtained from around 200 μm.

TABLE 6

| Al | Mn | Zn | Ni | Cu | Fe | Si | (Wt. %) Mg |
|---|---|---|---|---|---|---|---|
| 6.2 | 0.33 | 0.6 | 0.001 | 0.005 | 0.002 | 0.04 | balance |

Herein, in corrosion test, the corrosion resistance was evaluated by salt water spray test. The test conditions were temperature of 35° C., duration of 240 hours, and salt water concentration of 5 wt. %, and the test piece measures 50×90×5 mm, with the surface polished by emery #600, and the corrosion amount was calculated in the following formula.

$$MPY \text{ mills/year} = \frac{W \text{ (mg)} \times 143.7}{\rho \text{ (g/cm}^3\text{)} \times S \text{ (cm}^2\text{)} \times d \text{ (day)}} \quad \text{Formula 1}$$

where ρ: density

S: test area d: duration of test

W: corrosion weight 143.7 = (0.3973 × 365 days)

This is the inch/centimeter conversion factor.

Embodiment 11 (Relation among forging cooling rate, plastic processing rate, and crystal grain size)

Figure 14:
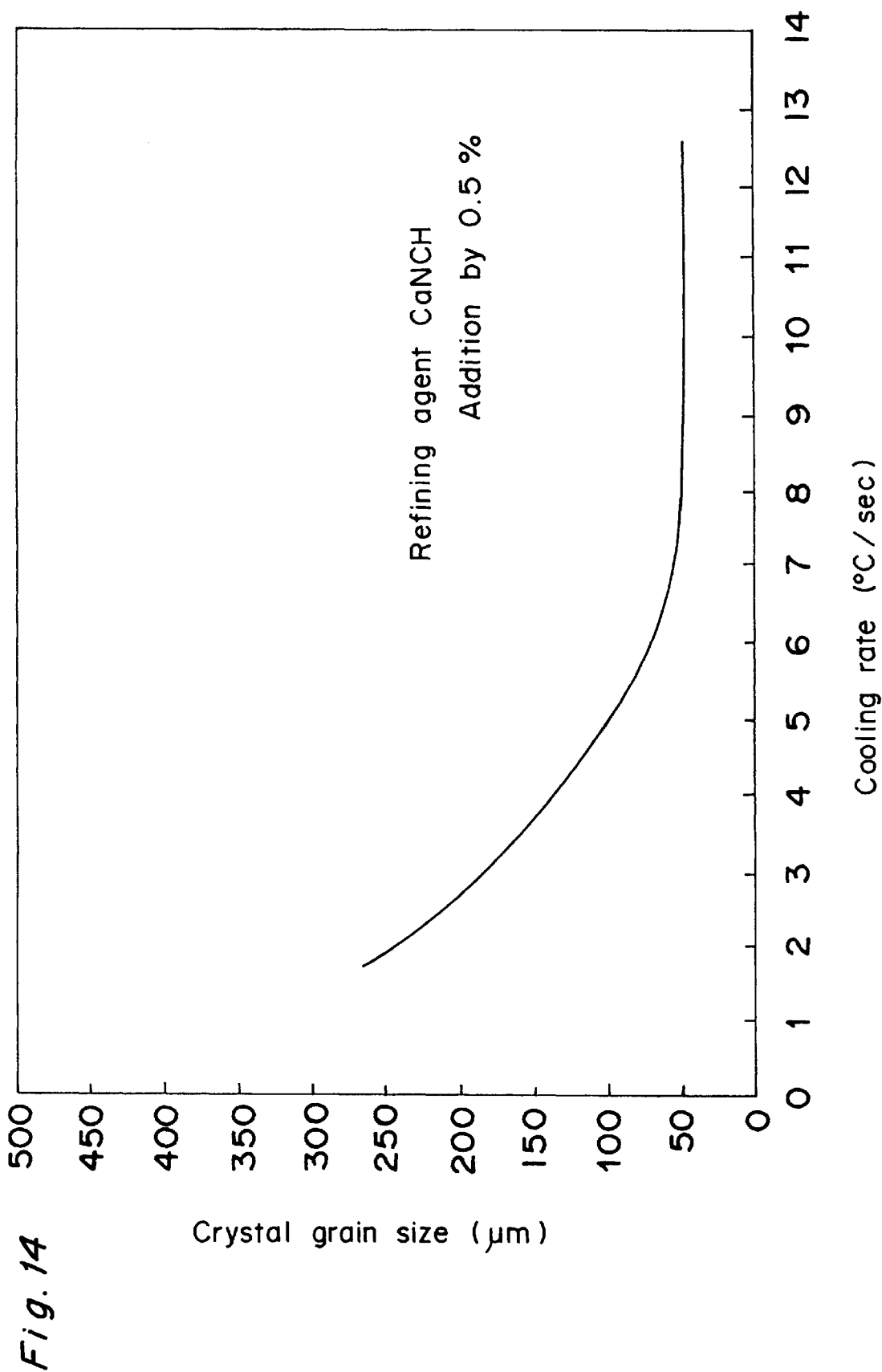
FIG. 14 is a graph showing the relation of cooling rate and crystal grain size in casting of cast material of the invention.

When casting a forging material (H 42 mm, φ28 mm) from the Mg alloy in the chemical composition shown in Table 5, 0.5 wt. % of refining agent CaNCN was added, and the relation between the cooling rate and the mean crystal grain size of cast material was determined. The result is shown in FIG. 14.

Figure 15:
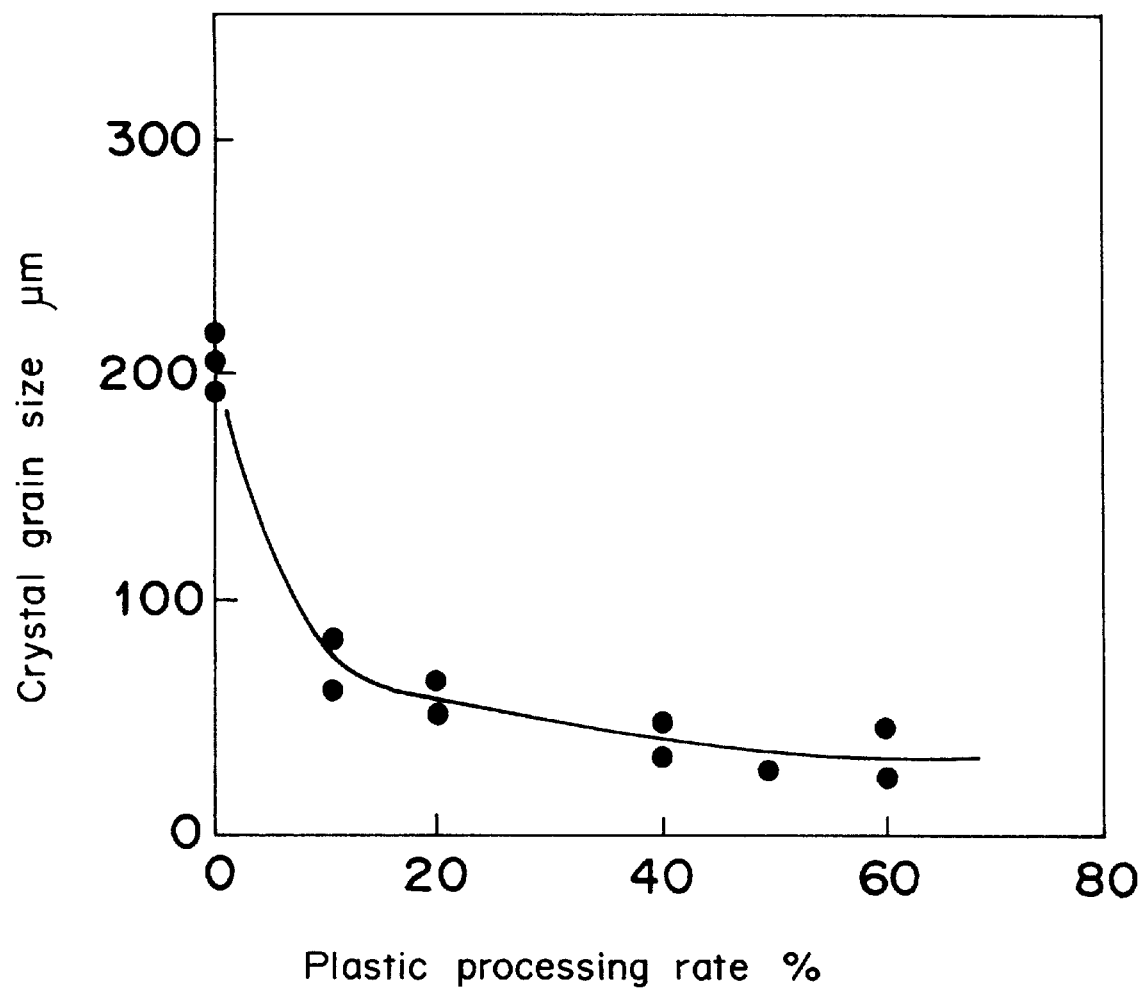
FIG. 15 is a graph showing the relation of plastic processing rate and crystal grain size of cast material of the invention.

Consequently, in the test apparatus shown in FIG. 2, it was processed by upsetting (strain speed: low speed, about $10^0$%/sec) at material temperature of 350° C., and the relation between the plastic processing rate and change of crystal grain size was determined. The result is shown in FIG. 15. The greater the plastic processing rate, it is known, the smaller becomes the crystal grain size of the Mg alloy of the invention.

Embodiment 12 (Manufacture of forged wheel)

Figure 16:
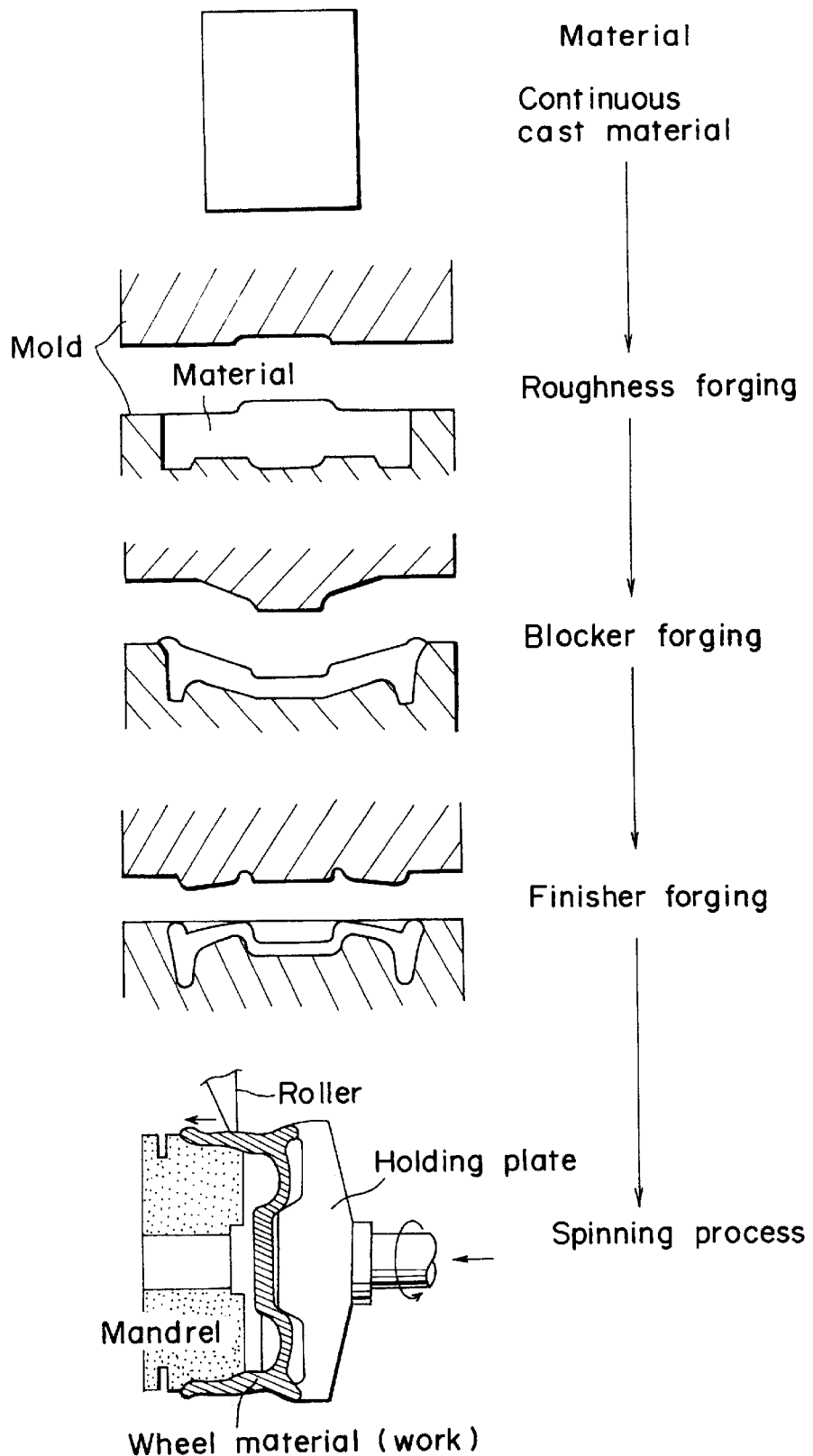
FIG. 16 is a process diagram showing a process of forming a wheel from continuous cast material of the alloy of the invention.

Using the Mg alloy in the chemical composition in Table 2, columnar billets are manufactured by continuous casting method, and are presented to roughness forging as shown in FIG. 16. Consequently presenting to blocker forging and finisher forging to forge a wheel material, it was finally processed by spinning and treating with T6 (400° C.×10 hours cooling in air, 175° C.×16 hours cooling in air), and a final product was obtained.

Figure 17:
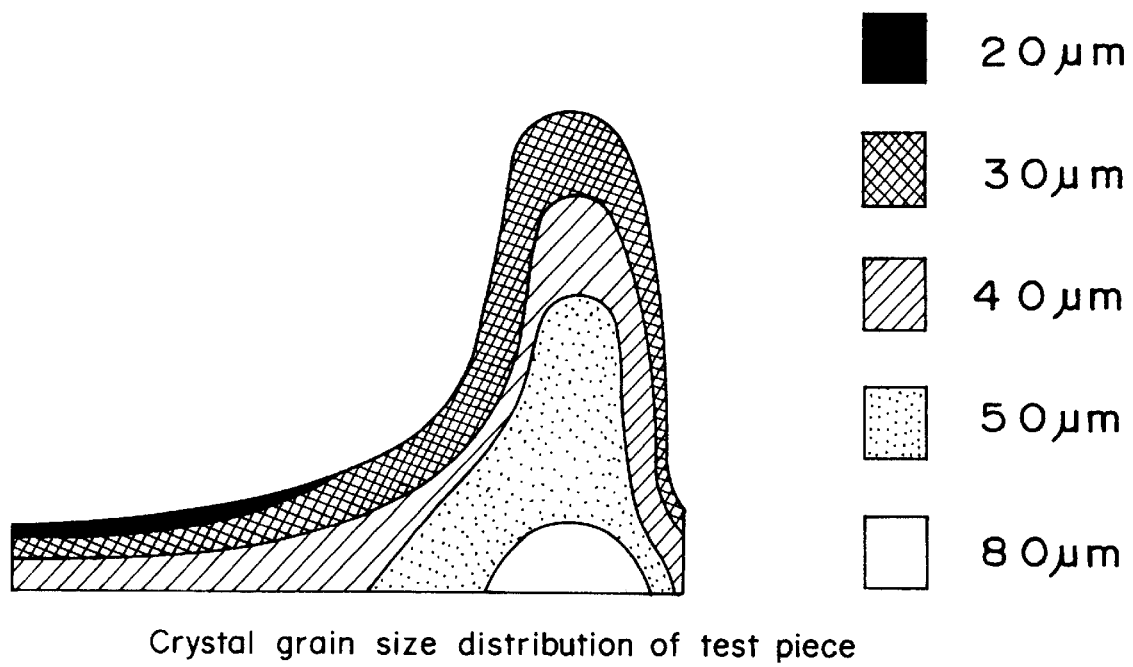
FIG. 17 is a crystal grain size distribution diagram of Mg alloy wheel manufactured in FIG. 16.

Its crystal grain size distribution is shown in FIG. 17, and fine crystal grains are distributed in the surface region.

Figure 18:
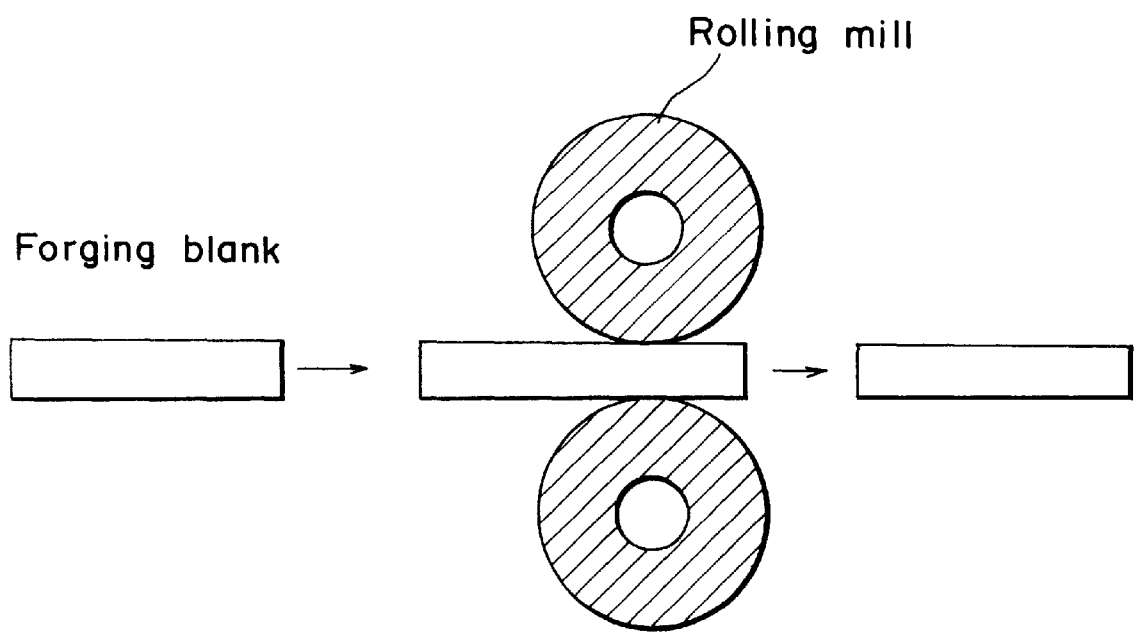
FIG. 18 is a schematic diagram showing an example of preliminary plastic processing of cast material of the invention.
Figure 19:
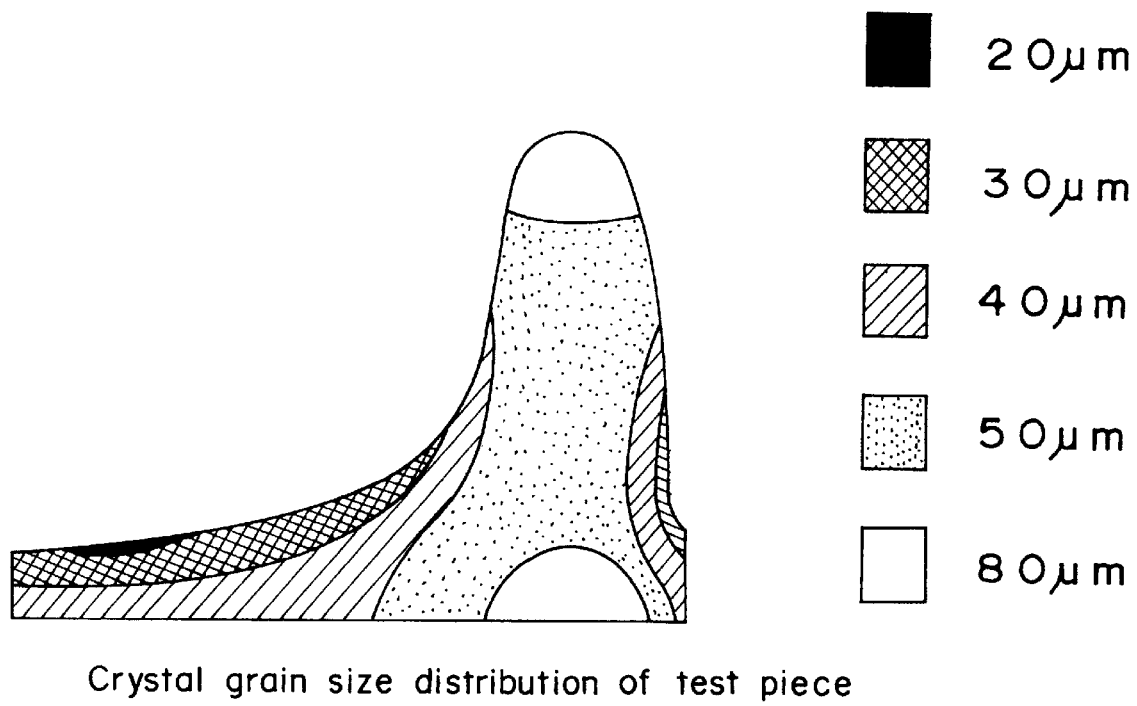
FIG. 19 is a crystal grain size distribution diagram of a wheel formed by a conventional method by using the alloy of the invention.

By contrast, only forging can make it to the final product without spinning process. In case of having relatively large crystal grains distributed in the surface region, as shown in FIG. 18, it is preferred to process the billet for forging by roller processing or other plastic processing in advance.

Instead of the roller processing, the crystal grain size of the surface region may be refined by accelerating the cooling rate in the forging process.

Embodiment 13 (Semi-molten cast forging method)

Figure 20:
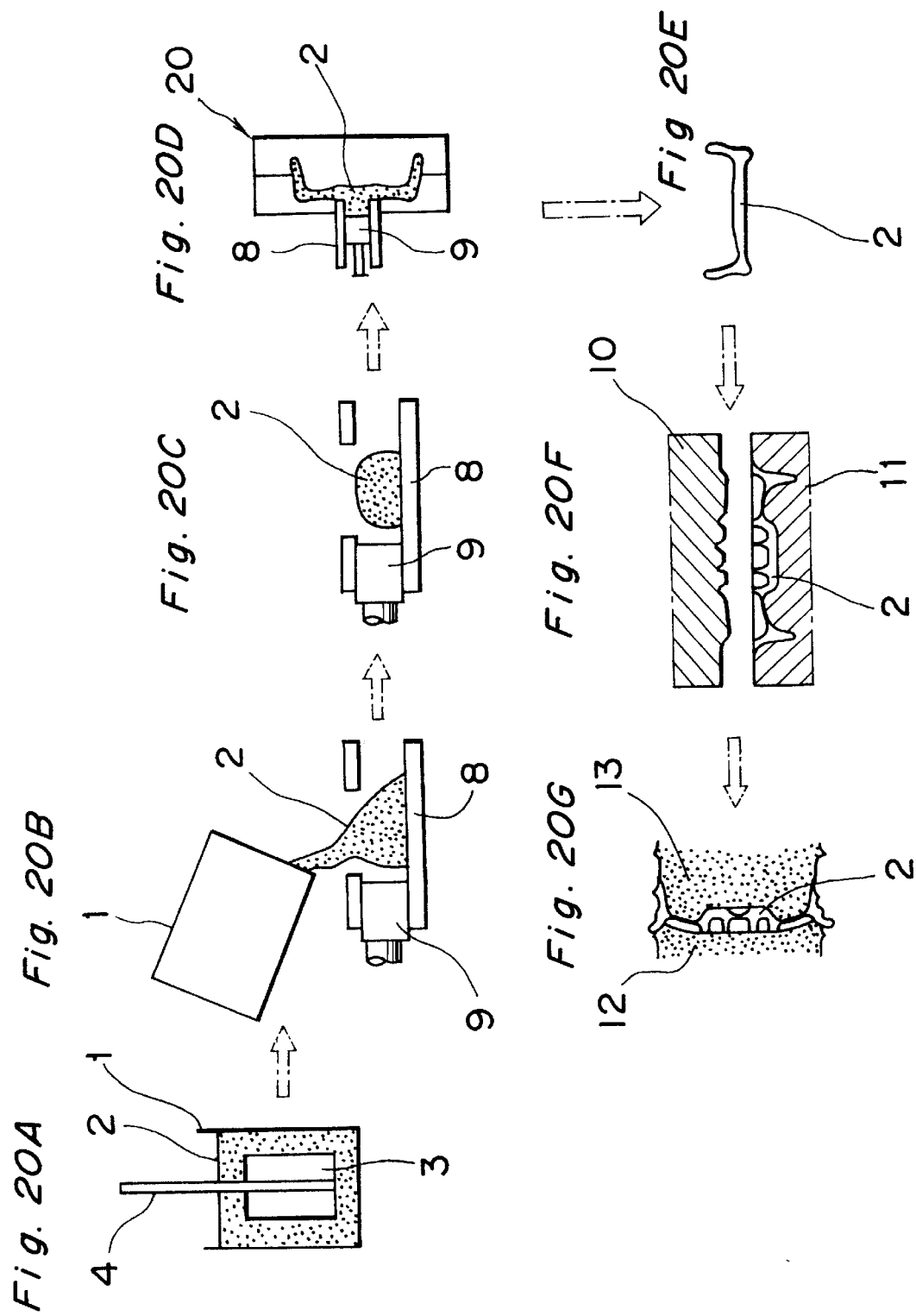
FIGS. 20(A), 20(B), 20(C), 20(D), 20(E), 20(F) and 20(G) are a process diagram for manufacturing a wheel by semi-molten forging method by using the alloy of the invention.

FIGS. 20 (A) to (G) denote manufacturing steps of the casting and forging method of automotive part (wheel) made of magnesium alloy according to the embodiment of the invention.

In the first place, as a light alloy material, a magnesium alloy material 2 in the composition in Table 5 is poured into a crucible 1, and is heated from around by a heater to be in semi-molten state, and a stirrer 4 having a stirring plate 3 is rotated and driven by a motor 5 so as to mix and stir in the manufacturing conditions shown in Table 7.

TABLE 7

| Solid-phase rate | Solid-phase rate (%) | | |
|---|---|---|---|
| Condition | 0 | ← Intermediate solid-phase → | 60 |
| Alloy temperature ° C. | 620 | rate is set arbitrarily depending on alloy temperature. | 592 |
| Stirring speed rpm | 300 | 300 | 300 |
| Stirring time min | 10 | 10 | 10 |

In this process of heating and stirring the magnesium alloy material 2 in the crucible 1, in the initial stage, the material 2 is heated to a temperature so as to be in the intermediate state between solid phase (α-phase) and liquid phase. Afterwards, in the same state, it is stirred by force by the stirring plate 3 in the condition in Table 7 (A in FIG. 20).

As a result, the dendritic solid phase is destroyed to be spherical. The solid-phase rate at this time is preferred to be 60% or less.

The semi-molten alloy material 2 in the crucible 1 thus controlled to the solid-phase rate of 60% or less is consequently poured into a sleeve 8 for die casting provided with a plunger 9 so as to change from state (B) to state (C) in FIG. 20 (B, C in FIG. 20).

Later, fitting the sleeve 8 to the feed port of a die-casting mold 20, the plunger 9 is operated to our the semi-molten alloy material 2 into the die-casting mold 20 and is cast (blank manufacture) (D in FIG. 20).

The alloy material 2 as an intermediate forming thus completed of semi-molten casting is taken out of the die-casting mold 20 (E in FIG. 20).

Using thus cast intermediate forming of the alloy material 2 as cast material, it is set on a lower pattern 11 for forging, and is forged once with an upper pattern 10 as final forming step, while the mechanical strength is enhanced (F in FIG. 20).

Embodiment 15 (Remaining of Sr)

Under the condition of the following Table 9, the cast material of which principal alloy elements are composed of Al, Mn and Zn wherein Al is 6.9 wt. %, Zn is 0.7 wt%, Mn is 0.38 wt % and the balance of Mg, is melt and the material temperature is raised up to about 780° C., then Sr-10% Al alloy was charged into the molten metal and depressed while stirring and lowering the temperature. When the molten temperature is raised up to about 700° C., the cast material is cast within the mold which is preheated at 70° C. to 85° C. and the Sr content in the cast material is examined as shown in FIG. 23.

Added Sr can remain in the alloy, thereby it keeps the refining effect even if remelt. Further, a part of added Sr forms an alloy with other alloy elements such as Mg or Al, which is crystallized out.

TABLE 9

| Sample No. | AZ770 melt (g) | Sr—Al addition (wt %) | Sr remaining content in the cast material (wt %) | Molten metal temp. at adding Sr (° C.) | Molten metal temp. at casting (° C.) | Mold temp. (° C.) | Sr remaining content in the forged product (wt %) |
|---|---|---|---|---|---|---|---|
| 1 | 597 | 0.11 | 0.017 | 784 | 703 | 80 | 0.015 |
| 2 | 610 | 0.26 | 0.038 | 783 | 703 | 85 | 0.030 |
| 3 | 625 | 0.58 | 0.084 | 782 | 703 | 70 | 0.055 |
| 4 | 600 | 1.1 | 0.165 | 783 | 703 | 75 | 0.145 |
| 5 | 600 | 2.2 | 0.33 | 783 | 702 | 70 | 0.285 |
| 6 | 670 | 5.5 | 0.74 | 780 | 703 | 75 | 0.590 |

Then, after JIS T6 heat treatment with solid solution treatment by, for example, air cooling for 4 hours at 400° C., and artificial aging by air cooling for 15 hours at 180° C., spin forging (spinning process) of fine parts is executed as being supported on jigs 12, 13, and a final formed product 2 is obtained (G in FIG. 20).

Embodiment 14 (Effect of adding the refining agent)

Sample 1 is prepared by adjusting and melting the magnesium alloy of the following composition as shown in Table 8, raising the material temperature up to about 780° C., without the refining agent, Sample 2 is prepared by the same way as above, but adding Sr-Al alloy to remain 0.02 wt % of Sr, Sample 3 is prepared by the same way as above, but adding 0.5 wt % of CaNCN and stirring. By changing the cooling rate in the continuous casting process, the relation between the mean crystal grain size of metal composition after casting and the cooling rate is examined.

Embodiment 16

In FIG. 24, Mg alloy wheel 2 is provided with a chemical coating 21 at surface thereof, which is coated by a paint layer 22 for improving the corrosion resistance. The chemical coating may be made by chromite treatment and so on. Among them, phosphate coating is preferred form waste disposal point. The paint coating may be made by cation electrode position, powder coating and so on.

On the other hand, for easy wheel production by forging, as shown in FIG. 25, the wheel body may be separated into a disk part 2A which is made of Mg alloy cast material and a rim part 2B which is made of the other light metal material such as Al alloy material. Both parts can be connected by bolts B.

EFFECT OF THE INVENTION

As clear from the description herein, according to the invention, a large-sized forged piece is provided with the

TABLE 8

| | | (wt %) | | | | | | | |
|---|---|---|---|---|---|---|---|---|---|
| Sample No. | Refining agent | Al | Mn | Zn | Ni | Cu | Fe | Si | Mg |
| 1 | none | 6.8 | 0.38 | 0.7 | 0.0005 | 0.001 | 0.001 | 0.02 | balance |
| 2 | Sr 0.02 wt % | 7.1 | 0.50 | 0.8 | 0.0005 | 0.001 | 0.001 | 0.03 | balance |
| 3 | CaNCN 0.5 wt % | 7.0 | 0.35 | 0.8 | 0.0005 | 0.001 | 0.001 | 0.03 | balance |

Figure 22:
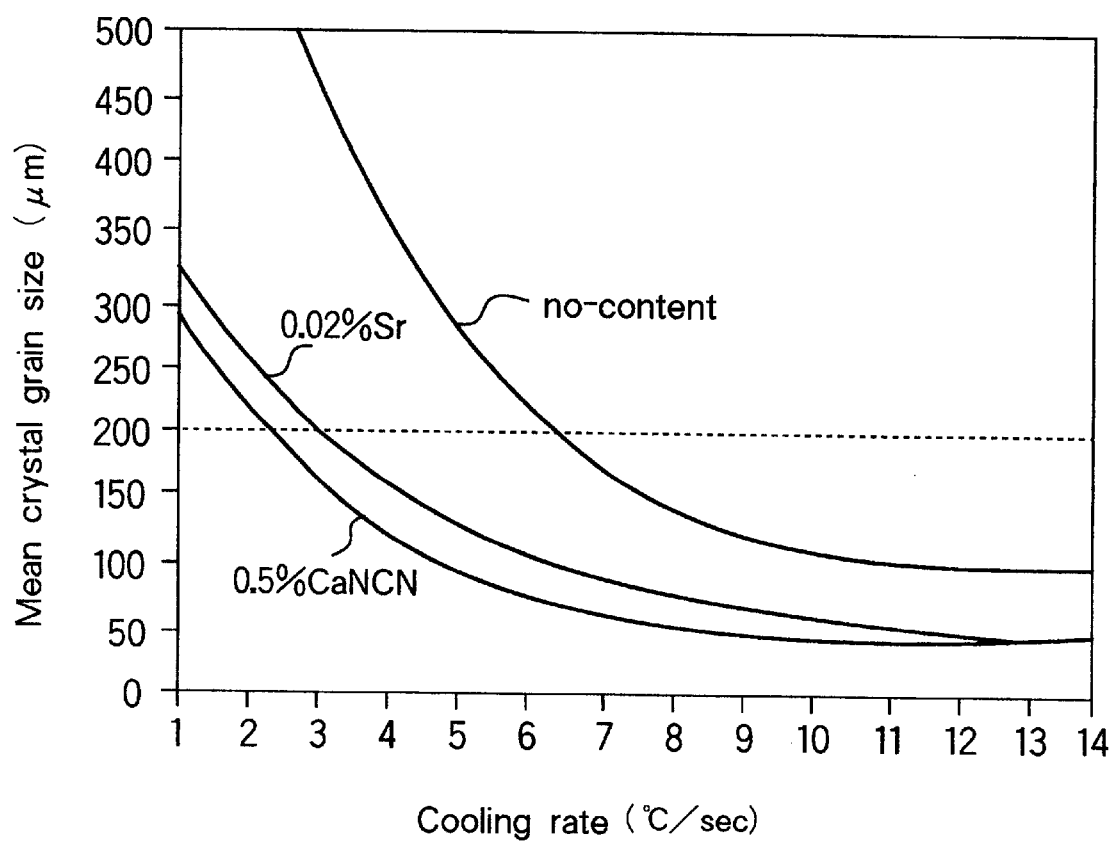
FIG. 22 is a graph showing relation between the cooling rate and the mean crystal grain size in case of adding the refining agent.

The result is shown in FIG. 22.

Figure 21:
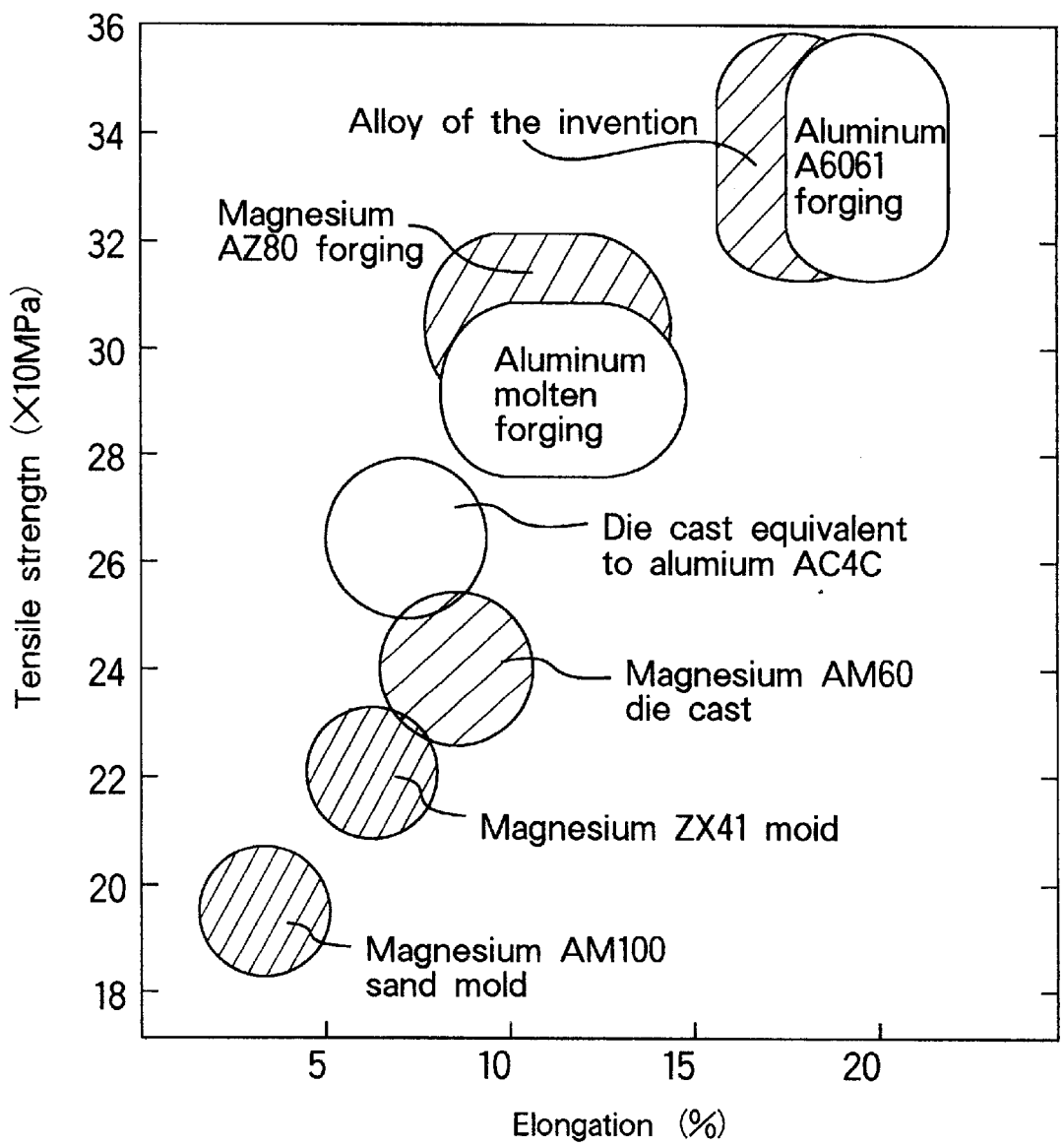
FIG. 21 is a graph showing the contrast of tensile strength and elongation between the forged piece of the invention and the conventional product.

In the case of adding no refining agent, the mean crystal grain size of metal texture is 200 μm or less by the usual continuous casting at about 7° C./sec cooling rate. On the other hand, adding Sr or CaNCN as the refining agent, the said mean crystal grain size is 200 μm or less at about 15° C./sec and the mean crystal grain size is 80 μm or less at about 7° C./sec cooling rate.

same tensile strength and elongation as aluminum A6061 as shown in FIG. 21 so as to have the tensile strength and elongation superior to those of the conventional Mg alloy AZ80. Such Mg alloy material can be supplied by continuous casting method, and therefore the Mg alloy preferably applicable to automotive wheel and other large-sized forged pieces can be presented.

What is claimed is:

1. A continuous cast magnesium alloy for forge processing, of which principal alloy elements consist essentially of Al, Mn and Zn, wherein Al is 6.2 to 7.6 weight percent; Mn is 0.15 to 0.5 weight percent; Zn is 0.4 to 0.8 weight percent and the mean crystal grain size of crystals throughout said continuous cast magnesium alloy is 200 μm or less, wherein said continuous cast magnesium alloy is made by continuous casting.

2. The magnesium alloy cast material for forge processing according to claim 1, wherein the mean crystal grain size of material matrix is 80 μm or less so as to provide excellent high speed forgeability.

3. A continuous cast magnesium alloy material for forge processing, of which principal alloy elements are composed of Al, Mn, Zn and Sr wherein Al is 6.2 to 7.6 wt. %; Mn is 0.15 to 0.5 wt. %; Zn is 0.4 to 0.8 wt. % and the mean crystal grain size of material matrix is 200 μm or less, wherein said continuous cast magnesium alloy material is made by continuous casting.

4. The magnesium alloy cast material for forge processing according to claim 3, wherein Sr is contained in the material matrix as an intermetallic compound.

5. A magnesium alloy member having good tensile characteristics with the mean crystal grain size of material matrix of 100 μm or less throughout said member, elongation of 10% or more, and tensile strength of 300 MPa or more, after forge processing of a continuous cast material of which principal alloy element are composed of Al, Mn and Zn, wherein Al is 6.2 to 7.6 wt. %; Mn is 0.15 to 0.5 wt. %; Zn is 0.4 to 0.8 wt. %, wherein said continuous cast material is made by continuous casting.

6. The magnesium alloy member of claim 5, wherein the mean crystal grain size of material matrix is 50 μm or less, and the Charpy impact value is higher than 50 J/cm$^2$.

7. The magnesium alloy member of claim 5, wherein the mean crystal grain size of material matrix is 50 μm or less after solution annealing and age hardening or T6 heat treatment, and the corrosion resistance is higher than that of AZ91D.

8. A magnesium alloy wheel for automobile, which comprises a disk part made of a continuous cast magnesium material and a rim part made of another light metal alloy material, wherein said continuous cast magnesium material is made by continuous casting.

9. A magnesium alloy continuous cast material for forge processing, of which principal alloy elements are composed of Al, Mn, Zn and CaCN$_2$ wherein Al is 6.2 to 7.6 wt. %; Mn is 0.15 to 0.5 wt. %; Zn is 0.4 to 0.8 wt. %; CaCN$_2$ is 0.3 to 0.7 wt. % and the mean crystal grain size of material matrix is 200 μm or less, which alloy has excellent forgeability as represented by an upsetting rate of more than 60% with respect to an upsetting rate after continuous casting.

10. A magnesium alloy member having tensile characteristics with the mean crystal grain size of material matrix of 100 μm or less throughout said member, elongation of 10% or more, and tensile strength of 300 MPa or more, after forge processing of a cast material of which principal alloy elements are composed of Al, Mn, Zn and CaCN$_2$ wherein Al is 6.2 to 7.6 wt. %; Mn is 0.15 to 0.5 wt. %; Zn is 0.4 to 0.8 wt. %; CaCN$_2$ is 0.3 to 0.7 wt. %.

11. The magnesium alloy wheel for automobile according to claim 8, which comprises a disk part made of the magnesium material and a rim part made of an aluminum alloy material.

12. The magnesium alloy continuous cast material for forge processing according to claim 1, wherein Al is 6.6 to 7.25 wt. %; Mn is 0.15 to 0.5 wt. %; Zn is 0.4 to 0.8 wt. %.

13. The magnesium alloy continuous cast material for forge processing according to claim 3, wherein Al is 6.6 to 7.25 wt. %; Mn is 0.15 to 0.5 wt. %; Zn is 0.4 to 0.8 wt. %; Sr is 0.02 to 0.5 wt. %.

14. The magnesium alloy member according to claim 5, wherein Al is 6.6 to 7.25 wt. %; Mn is 0.15 to 0.5 wt. %; Zn is 0.4 to 0.8 wt. %.

15. The magnesium alloy member of claim 14, further being subjected to T6 heat treatment after forge processing wherein the mean crystal grain size of material matrix is 50 μm or less, and the corrosion resistance is higher than that of AZ91D.

16. The magnesium alloy member according to claim 14, wherein Al is 6.6 to 7.25 wt. %; Mn is 0.15 to 0.5 wt. %; Zn is 0.4 to 0.8 wt. %.

17. The magnesium alloy cast material for forge processing according to claim 3, wherein Sr is 0.02 to 0.5 wt. %.

18. A magnesium alloy member having good tensile characteristics with the mean crystal grain size of material matrix of 100 μm or less throughout said member, elongation of 10% or more, and tensile strength of 300 MPa or more, after forge processing of a continuous cast material, wherein principal alloy elements are Al, Mn, Zn and Sr, where Al is 6.2 to 7.6 wt. %; Mn is 0.15 to 0.5 wt. %; Zn is 0.4 to 0.8 wt. %; Sr is 0.02 to 0.5 wt. %, wherein said continuous cast material is made by continuous casting.

19. The magnesium alloy member of claim 18, wherein the mean crystal grain size of material matrix is 50 μm or less, and the Charpy impact value is higher than 50 J/cm$^2$.

20. The magnesium alloy member of claim 18, wherein the mean crystal grain size of material matrix is 50 μm or less, and the corrosion resistance is higher than that of AZ91D.

21. A magnesium alloy wheel for an automobile having good tensile characteristics with the mean crystal grain size of material matrix of 50 μm or less and Charpy impact value after forge processing of a continuous cast material is higher than 50 J/cm$^2$, wherein principal alloy elements are Al, Mn and Zn, where Al is 6.2 to 7.6 wt. %; Mn is 0.15 to 0.5 wt. %; Zn is 0.4 to 0.87 wt. %, wherein said continuous cast material is made by continuous casting.

22. The magnesium alloy wheel for automobile according to claim 21, the corrosion resistance after solution annealing and age hardening or T6 heat treatment, is higher than that of AZ91D.

23. The magnesium alloy wheel for automobile according to claim 21, on which surface a chemical conversion coating is formed and further is coated by paint.

24. The magnesium alloy wheel for automobile according to claim 21, wherein said alloy wheel is made of a continuous cast magnesium alloy having a specific gravity of about 1.8.

25. The magnesium alloy wheel for automobile according to claim 21, which comprises a disk part made of the magnesium material and a rim part made of another light metal alloy material.

26. The magnesium alloy wheel for an automobile according to claim 21, wherein Al is 6.6 to 7.25 wt. %; Mn is 0.15 to 0.5 wt. %; Zn is 0.4 to 0.8 wt. %.

27. The magnesium alloy wheel for automobile according to claim 26, where the corrosion resistance after being subjected to solution annealing and age hardening is higher than that of AZ61D.

28. The magnesium alloy wheel for automobile according to claim 26, on which surface a chemical conversion coating is formed and further is coated by paint.

29. The magnesium alloy member having good tensile characteristics according to claim 18, wherein Al is 6.6 to 7.25 wt. %.

30. A continuous cast magnesium alloy material for forge processing, of which principal alloy elements are composed of Al, Mn, Zn and $CaCN_2$ wherein Al is 6.2 to 7.6 wt. %; Mn is 0.15 to 0.5 wt. %; Zn is 0.4 to 0.8 wt. %; $CaCN_2$ is 0.3 to 0.7 wt. % and the mean crystal grain size of material matrix is 200 μm or less, wherein said continuous cast magnesium alloy material is made by continuous casting.

31. The continuous cast magnesium alloy of claim 1, wherein said continuous cast magnesium alloy has excellent forgeability as represented by an upsetting rate of more than 60% after said continuous casting.

32. The continuous cast magnesium alloy material of claim 3, wherein said continuous cast magnesium alloy material has excellent forgeability as represented by an upsetting rate of more than 60% after said continuous casting.

33. The magnesium alloy member of claim 5, wherein said continuous cast material has excellent forgeability as represented by an upsetting rate of more than 60% after said continuous casting.

34. The magnesium alloy wheel of claim 8, wherein said continuous cast magnesium material has excellent forgeability as represented by an upsetting rate of more than 60% after said continuous casting.

35. The magnesium alloy member of claim 18, wherein said continuous cast material has excellent forgeability as represented by an upsetting rate of more than 60% after said continuous casting.

36. The magnesium alloy wheel of claim 21, wherein said continuous cast material has excellent forgeability as represented by an upsetting rate of more than 60% after said continuous casting.

37. The magnesium alloy wheel for automobile according to claim 25, which comprises a disk part made of the magnesium material and a rim part made of an aluminum alloy material.

* * * * *